(12) United States Patent
Kamikawabata et al.

(10) Patent No.: US 11,863,017 B2
(45) Date of Patent: Jan. 2, 2024

(54) LAMINATED CORE AND ELECTRIC MOTOR

(71) Applicant: NIPPON STEEL CORPORATION, Tokyo (JP)

(72) Inventors: Masahito Kamikawabata, Tokyo (JP); Ryu Hirayama, Tokyo (JP); Kazutoshi Takeda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 406 days.

(21) Appl. No.: 17/293,795

(22) PCT Filed: Dec. 17, 2019

(86) PCT No.: PCT/JP2019/049267
§ 371 (c)(1),
(2) Date: May 13, 2021

(87) PCT Pub. No.: WO2020/129926
PCT Pub. Date: Jun. 25, 2020

(65) Prior Publication Data
US 2022/0014052 A1 Jan. 13, 2022

(30) Foreign Application Priority Data
Dec. 17, 2018 (JP) .................. 2018-235860

(51) Int. Cl.
*H02K 1/18* (2006.01)
*H02K 1/02* (2006.01)

(52) U.S. Cl.
CPC ............... *H02K 1/185* (2013.01); *H02K 1/02* (2013.01); *H02K 2213/03* (2013.01)

(58) Field of Classification Search
CPC ....... H02K 1/02; H02K 1/185; H02K 2213/03
See application file for complete search history.

(56) References Cited

U.S. PATENT DOCUMENTS

| 5,142,178 A | 8/1992 | Kloster et al. |
|---|---|---|
| 5,248,405 A | 9/1993 | Kaneda et al. |

(Continued)

FOREIGN PATENT DOCUMENTS

| CN | 102792556 A | 11/2012 |
|---|---|---|
| EP | 3553799 A1 | 10/2019 |

(Continued)

OTHER PUBLICATIONS

Datasheet of Nylon 6, Cast (Year: N/A, Printed Jun. 28, 2023).

(Continued)

*Primary Examiner* — Jue Zhang
(74) *Attorney, Agent, or Firm* — Renner, Otto, Boisselle & Sklar, LLP

(57) ABSTRACT

A laminated core includes a plurality of electrical steel sheets stacked on each other, and an adhesion part provided between electrical steel sheets adjacent to each other in a stacking direction and configured to adhere the electrical steel sheets to each other, wherein the adhesion part partially adheres the electrical steel sheets adjacent to each other in the stacking direction, and the adhesion parts adjacent to each other in the stacking direction have different arrangement regions in a plan view seen in the stacking direction.

7 Claims, 22 Drawing Sheets

(56) References Cited

U.S. PATENT DOCUMENTS

| | | | |
|---|---|---|---|
| 5,338,996 | A | 8/1994 | Yamamoto |
| 5,448,119 | A | 9/1995 | Kono et al. |
| 5,994,464 | A | 11/1999 | Ohsawa et al. |
| 6,495,936 | B2 | 12/2002 | Kikuchi et al. |
| 6,653,758 | B2 | 11/2003 | Tsuneyoshi et al. |
| 7,859,163 | B2 | 12/2010 | Bertocchi et al. |
| 7,952,254 | B2 | 5/2011 | Cho et al. |
| 8,581,468 | B2 | 11/2013 | Kudose et al. |
| 8,697,811 | B2 | 4/2014 | Kishi et al. |
| 9,318,923 | B2 * | 4/2016 | Nagai .................... H02K 1/148 |
| 9,331,530 | B2 * | 5/2016 | Jang ....................... H02K 1/146 |
| 9,512,335 | B2 | 12/2016 | Hoshi et al. |
| 9,770,949 | B2 | 9/2017 | Fudemoto et al. |
| 10,033,232 | B2 * | 7/2018 | Matsunaga ........... B32B 15/043 |
| 10,340,754 | B2 | 7/2019 | Ogino et al. |
| 10,348,170 | B2 | 7/2019 | Izumi et al. |
| 10,491,059 | B2 | 11/2019 | Murakami et al. |
| 10,547,225 | B2 * | 1/2020 | Hattori .................... H02K 1/185 |
| 10,574,112 | B2 | 2/2020 | Tomonaga |
| 10,819,201 | B2 | 10/2020 | Thumm et al. |
| 10,840,749 | B2 | 11/2020 | Chaillou et al. |
| 11,056,934 | B2 | 7/2021 | Kubota et al. |
| 11,616,407 | B2 | 3/2023 | Hino et al. |
| 2002/0047459 | A1 | 4/2002 | Adaeda et al. |
| 2004/0056556 | A1 | 3/2004 | Fujita |
| 2004/0124733 | A1 | 7/2004 | Yamamoto et al. |
| 2007/0040467 | A1 | 2/2007 | Gu |
| 2007/0182268 | A1 | 8/2007 | Tashiba et al. |
| 2009/0026873 | A1 * | 1/2009 | Matsuo ................ H02K 15/022 310/216.019 |
| 2009/0195110 | A1 | 8/2009 | Miyaki |
| 2009/0230812 | A1 | 9/2009 | Cho et al. |
| 2010/0197830 | A1 | 8/2010 | Hayakawa et al. |
| 2010/0219714 | A1 * | 9/2010 | Abe ....................... H02K 1/146 310/216.048 |
| 2010/0244617 | A1 | 9/2010 | Nobata et al. |
| 2011/0269894 | A1 | 11/2011 | Miyamoto |
| 2012/0088096 | A1 | 4/2012 | Takeda et al. |
| 2012/0128926 | A1 | 5/2012 | Ohishi et al. |
| 2012/0288659 | A1 | 11/2012 | Hoshi et al. |
| 2013/0244029 | A1 | 9/2013 | Igarashi et al. |
| 2014/0023825 | A1 | 1/2014 | Igarashi et al. |
| 2015/0028717 | A1 | 1/2015 | Luo et al. |
| 2015/0130318 | A1 | 5/2015 | Kitada et al. |
| 2015/0256037 | A1 | 9/2015 | Kudose |
| 2015/0337106 | A1 | 11/2015 | Kajihara |
| 2016/0023447 | A1 | 1/2016 | Shimizu |
| 2016/0352165 | A1 | 12/2016 | Fubuki |
| 2017/0117758 | A1 | 4/2017 | Nakagawa |
| 2017/0342519 | A1 | 11/2017 | Uesaka et al. |
| 2018/0030292 | A1 | 2/2018 | Gotou |
| 2018/0056629 | A1 | 3/2018 | Hamamura |
| 2018/0159389 | A1 | 6/2018 | Nishikawa |
| 2018/0212482 | A1 | 7/2018 | Nigo |
| 2018/0295678 | A1 | 10/2018 | Okazaki et al. |
| 2018/0342925 | A1 | 11/2018 | Horii et al. |
| 2019/0010361 | A1 | 1/2019 | Hoshi |
| 2019/0040183 | A1 | 2/2019 | Hitachi |
| 2020/0048499 | A1 | 2/2020 | Andou et al. |
| 2020/0099263 | A1 | 3/2020 | Hirosawa et al. |
| 2020/0186014 | A1 | 6/2020 | Kusuyama |
| 2021/0296975 | A1 | 9/2021 | Hino et al. |

FOREIGN PATENT DOCUMENTS

| | | |
|---|---|---|
| EP | 3562006 A1 | 10/2019 |
| FR | 2803126 A1 | 6/2001 |
| JP | 56-065326 A | 6/1981 |
| JP | 57-006427 A | 1/1982 |
| JP | 60-170681 A | 9/1985 |
| JP | 60-186834 A | 12/1985 |
| JP | 60-186834 U | 12/1985 |
| JP | 63-207639 A | 8/1988 |
| JP | 03-124247 A | 5/1991 |
| JP | 03-247683 A | 11/1991 |
| JP | 04-028743 A | 3/1992 |
| JP | 04-028743 U | 3/1992 |
| JP | 07-118620 A | 5/1995 |
| JP | 07-298567 A | 11/1995 |
| JP | 08-259899 A | 10/1996 |
| JP | 11-162724 A | 6/1999 |
| JP | 2000-050539 A | 2/2000 |
| JP | 2000-152570 A | 5/2000 |
| JP | 2001-115125 A | 4/2001 |
| JP | 2002-078257 A | 3/2002 |
| JP | 2002-088107 A | 3/2002 |
| JP | 2002-105283 A | 4/2002 |
| JP | 2002-125341 A | 4/2002 |
| JP | 2002-151335 A | 5/2002 |
| JP | 2002-151339 A | 5/2002 |
| JP | 2002-164224 A | 6/2002 |
| JP | 2002-332320 A | 11/2002 |
| JP | 2003-199303 A | 7/2003 |
| JP | 2003-206464 A | 7/2003 |
| JP | 2003-219585 A | 7/2003 |
| JP | 2003-264962 A | 9/2003 |
| JP | 2003284274 A | 10/2003 |
| JP | 2004-088970 A | 3/2004 |
| JP | 2004-111509 A | 4/2004 |
| JP | 2004-150859 A | 5/2004 |
| JP | 2005-019642 A | 1/2005 |
| JP | 2005-268589 A | 9/2005 |
| JP | 2005-269732 A | 9/2005 |
| JP | 2006-254530 A | 9/2006 |
| JP | 2006-288114 A | 10/2006 |
| JP | 2006-353001 A | 12/2006 |
| JP | 2007015302 A | 1/2007 |
| JP | 2007-039721 A | 2/2007 |
| JP | 2008-067459 A | 3/2008 |
| JP | 4143090 B | 9/2008 |
| JP | 2009-177895 A | 8/2009 |
| JP | 2010-004716 A | 1/2010 |
| JP | 2010-220324 A | 9/2010 |
| JP | 2010-259158 A | 11/2010 |
| JP | 2011-023523 A | 2/2011 |
| JP | 2011-195735 A | 10/2011 |
| JP | 2012029494 A | 2/2012 |
| JP | 2012-061820 A | 3/2012 |
| JP | 2012-120299 A | 6/2012 |
| JP | 2013-089883 A | 5/2013 |
| JP | 2013-181101 A | 9/2013 |
| JP | 2013-253153 A | 12/2013 |
| JP | 2014-096429 A | 5/2014 |
| JP | 2014-155347 A | 8/2014 |
| JP | 2015-012756 A | 1/2015 |
| JP | 2015-082848 A | 4/2015 |
| JP | 2015-136228 A | 7/2015 |
| JP | 2015-142453 A | 8/2015 |
| JP | 2015-164389 A | 9/2015 |
| JP | 2015-171202 A | 9/2015 |
| JP | 2016-025317 A | 2/2016 |
| JP | 2016-046969 A | 4/2016 |
| JP | 2016-073109 A | 5/2016 |
| JP | 2016-140134 A | 8/2016 |
| JP | 2016-171652 A | 9/2016 |
| JP | 2016167907 A | 9/2016 |
| JP | 2017-005906 A | 1/2017 |
| JP | 2017-011863 A | 1/2017 |
| JP | 2017-028911 A | 2/2017 |
| JP | 2017-046442 A | 3/2017 |
| JP | 2017-075279 A | 4/2017 |
| JP | 2017-218596 A | 12/2017 |
| JP | 2018-038119 A | 3/2018 |
| JP | 2018-061319 A | 4/2018 |
| JP | 2018-078691 A | 5/2018 |
| JP | 2018-083930 A | 5/2018 |
| JP | 2018-093704 A | 6/2018 |
| JP | 2018-107852 A | 7/2018 |
| JP | 2018/138634 A | 9/2018 |
| JP | 2018-145492 A | 9/2018 |
| KR | 10-2018-0110157 A | 10/2018 |
| TW | 201809023 A | 3/2018 |
| WO | 2010/082482 A1 | 7/2010 |

(56) References Cited

FOREIGN PATENT DOCUMENTS

| WO | 2011/013691 | A1 | 2/2011 |
|---|---|---|---|
| WO | 2011/054065 | A2 | 5/2011 |
| WO | 2014/102915 | A1 | 7/2014 |
| WO | 2016017132 | A1 | 2/2016 |
| WO | 2017/033229 | A1 | 3/2017 |
| WO | 2017104479 | A1 | 6/2017 |
| WO | 2017/170957 | A | 10/2017 |
| WO | 2017/199527 | A1 | 11/2017 |
| WO | 2018/043429 | A1 | 3/2018 |
| WO | 2018/093130 | A1 | 5/2018 |
| WO | 2018/105473 | A1 | 6/2018 |
| WO | 2018/138864 | A1 | 8/2018 |
| WO | 2018/207277 | A1 | 11/2018 |
| WO | 2018/216565 | A1 | 11/2018 |
| WO | 2020/129921 | A1 | 6/2020 |
| WO | 2020/129923 | A1 | 6/2020 |
| WO | 2020/129924 | A1 | 6/2020 |
| WO | 2020/129925 | A1 | 6/2020 |
| WO | 2020/129927 | A1 | 6/2020 |
| WO | 2020/129928 | A1 | 6/2020 |
| WO | 2020/129929 | A1 | 6/2020 |
| WO | 2020/129935 | A1 | 6/2020 |
| WO | 2020/129936 | A1 | 6/2020 |
| WO | 2020/129937 | A1 | 6/2020 |
| WO | 2020/129938 | A1 | 6/2020 |
| WO | 2020/129940 | A1 | 6/2020 |
| WO | 2020/129941 | A1 | 6/2020 |
| WO | 2020/129942 | A1 | 6/2020 |
| WO | 2020/129946 | A1 | 6/2020 |
| WO | 2020/129948 | A1 | 6/2020 |
| WO | 2020/129951 | A1 | 6/2020 |

OTHER PUBLICATIONS

Japanese Industrial Standard (JIS) C 2552: 2014, relevance discussed in specification.
Japanese Industrial Standard (JIS) C 2553: 2012, relevance discussed in specification.
Japanese Industrial Standard (JIS) R 1602: 1995, relevance discussed in specification.
Japanese Industrial Standard (JIS) Z 2241: 2011.
Japanese Industrial Standard (JIS) K 7252-1:2016.
Japanese Industrial Standard (JIS) K 7121-1987.
Japanese Industrial Standard (JIS) K 6850: 1999.
The papers of technical meetings in the Institute of Electrical Engineers of Japan,RM-92-79, 1992.
Matweb, "Plaskolite West Optix@ CA—41 FDA General Purpose Acrylic Resin", 2 pages, retrieved online Dec. 19, 2022, www.matweb.com/search/DataSheet.aspx?MatGUID=ceec51c04f714fb383d01496424432d9. (Year: 2022).

* cited by examiner

LAMINATED CORE AND ELECTRIC MOTOR

TECHNICAL FIELD

The present invention relates to a laminated core and an electric motor.

Priority is claimed on Japanese Patent Application No. 2018-235860, filed Dec. 17, 2018, the content of which is incorporated herein by reference.

BACKGROUND ART

Conventionally, laminated cores as described in Patent Documents 1 and 2 below are known. In these laminated cores, electrical steel sheets adjacent to each other in a stacking direction are adhered by an adhesive layer.

CITATION LIST

[Patent Document]
[Patent Document 1]

Japanese Unexamined Patent Application, First Publication No. 2006-288114

[Patent Document 2]

Japanese Unexamined Patent Application, First Publication No. 2016-171652

SUMMARY OF THE INVENTION

Problems to be Solved by the Invention

In a conventional laminated core, there is room for improvement in regard to improving the motor characteristics such as having little vibration and noise when a laminated core constitutes an electric motor.

The present invention has been made in view of the above circumstances, and an object thereof is to enhance motor characteristics.

Means for Solving the Problem

In order to solve the above problems, the present invention proposes the following means.

(1) A first aspect of the present invention is a laminated core including a plurality of electrical steel sheets stacked on each other, and an adhesion part provided between electrical steel sheets adjacent to each other in a stacking direction and configured to adhere the electrical steel sheets to each other, wherein the adhesion part partially adheres the electrical steel sheets adjacent to each other in the stacking direction, and the adhesion parts adjacent to each other in the stacking direction have different arrangement regions in a plan view seen in the stacking direction.

Here, in the adhesion parts adjacent to each other in the stacking direction, the fact that the arrangement regions are different from each other in a plan view seen in the stacking direction means that one of the adhesion parts adjacent to each other in the stacking direction and the other one do not overlap at all in the plan view seen in the stacking direction.

With such a configuration, as compared with a case in which the arrangement regions of the adhesion parts adjacent to each other in the stacking direction overlap each other in the plan view seen in the stacking direction, the least common multiple of the adhesion part adjacent to a predetermined adhesion part in the stacking direction, and the adhesion part adjacent to the predetermined adhesion part in the circumferential direction becomes large. Therefore, the resonance frequency of the laminated core can be increased. As a result, it is possible to prevent the resonance frequencies of the electric motor and the laminated core from matching. Therefore, the laminated core is less likely to vibrate, and the motor characteristics of the laminated core can be improved.

(2) The laminated core described in (1), the electrical steel sheet may include an annular core back part, and a plurality of tooth parts which protrude from the core back part in a radial direction and are disposed at intervals in a circumferential direction of the core back part; and the adhesion parts may be provided on at least one of a stacking surface of the core back part and a stacking surface of the tooth part.

Generally, an adhesive shrinks as it cures. Therefore, compressive stress is applied to the electrical steel sheet as the adhesive cures. When the compressive stress is applied, the electrical steel sheet becomes strained.

With such a configuration, a size of a region in which the adhesion part is provided is reduced as compared with a case in which the adhesion part is provided on the entire surface of the stacking surface of the electrical steel sheet. Therefore, an amount of strain applied to the electrical steel sheet by the adhesion part is reduced. Therefore, deterioration of the magnetic properties of the laminated core can be curbed.

(3) In the laminated core described in (1) or (2), in the adhesion parts, the arrangement regions may overlap each other at an N-layer interval (N is a natural number) in a plan view seen in the stacking direction.

With such a configuration, for example, in a plan view seen in the stacking direction, the strain generated in the electrical steel sheet becomes uniform in the stacking direction in contrast to a case in which the arrangement regions of the adhesion parts overlap each other in the stacking direction at a non-constant interval. Therefore, it is possible to curb biasing of the strain generated in the electrical steel sheet due to the curing of the adhesive in the laminated core as a whole.

(4) In the laminated core described in (3), N may be 1.

With such a configuration, N is 1, and the arrangement regions overlap each other at a one-layer interval. Therefore, it is possible to curb local concentration of the electrical steel sheets joined by adhesion on a part of the laminated core in the stacking direction. Therefore, the electrical steel sheets joined by adhesion can be dispersed in the stacking direction. Therefore, it is possible to prevent the resonance frequencies of the electric motor and the laminated core from matching. As a result, motor characteristics of the laminated core can be further improved.

(5) In the laminated core described in (3), N may be a prime number.

With such a configuration, since the number of divisors of N which is a prime number is small, the least common multiple of the adhesion part adjacent to a predetermined adhesion part in the stacking direction, and the adhesion part adjacent to the predetermined adhesion part in the circumferential direction becomes large. Therefore, the resonance frequency of the laminated core can be increased. As a result, it is possible to prevent the resonance frequencies of the electric motor and the laminated core from matching. Therefore, the motor characteristics of the laminated core can be further improved.

(6) In the laminated core described in any one of (1) to (5); a stacking surface of the electrical steel sheet located at one end in the stacking direction among the plurality of electrical steel sheets may be entirely adhered to a stacking surface of the electrical steel sheet adjacent to it in the stacking direction; and a stacking surface of the electrical steel sheet located at the other end in the stacking direction among the plurality of electrical steel sheets may be entirely adhered to a stacking surface of the electrical steel sheet adjacent to it in the stacking direction.

With such a configuration, separation of the stacking surface of the electrical steel sheet located at one end in the stacking direction and the stacking surface of the electrical steel sheet adjacent to this surface in the stacking direction among the electrical steel sheets from each other in the stacking direction is curbed at both an outer peripheral edge and a central portion of the surface. Therefore, it is possible to curb generation of vibration between the surfaces adjacent to each other in the stacking direction.

Similarly, in the electrical steel sheet located at the other end in the stacking direction among the electrical steel sheets, it is also possible to curb the generation of vibration between the surfaces adjacent to each other in the stacking direction.

(7) In the laminated core described in any one of (1) to (6), an average thickness of the adhesion parts may be 1.0 μm to 3.0 μm.

(8) In the laminated core described in any one of (1) to (7), an average tensile modulus of elasticity E of the adhesion parts may be 1500 MPa to 4500 MPa.

(9) The laminated core described in any one of (1) to (8), the adhesion part may be a room temperature adhesion type acrylic-based adhesive containing SGA made of an elastomer-containing acrylic-based adhesive.

(10) A second aspect of the present invention is an electric motor including the laminated core described in any one of (1) to (9).

According to such a configuration, it is possible to enhance the motor characteristics of an electric motor.

Effects of the Invention

According to the present invention, it is possible to enhance motor characteristics.

EMBODIMENTS FOR IMPLEMENTING THE INVENTION

Hereinafter, a laminated core and an electric motor according to an embodiment of the present invention will be described with reference to the drawings.

In the present embodiment, a motor, specifically an AC motor will be exemplified as the electric motor. The AC motor is more specifically a synchronous motor, and even more specifically, a permanent magnetic electric motor. This type of motor is suitably adopted for, for example, an electric vehicle.

Figure 1:
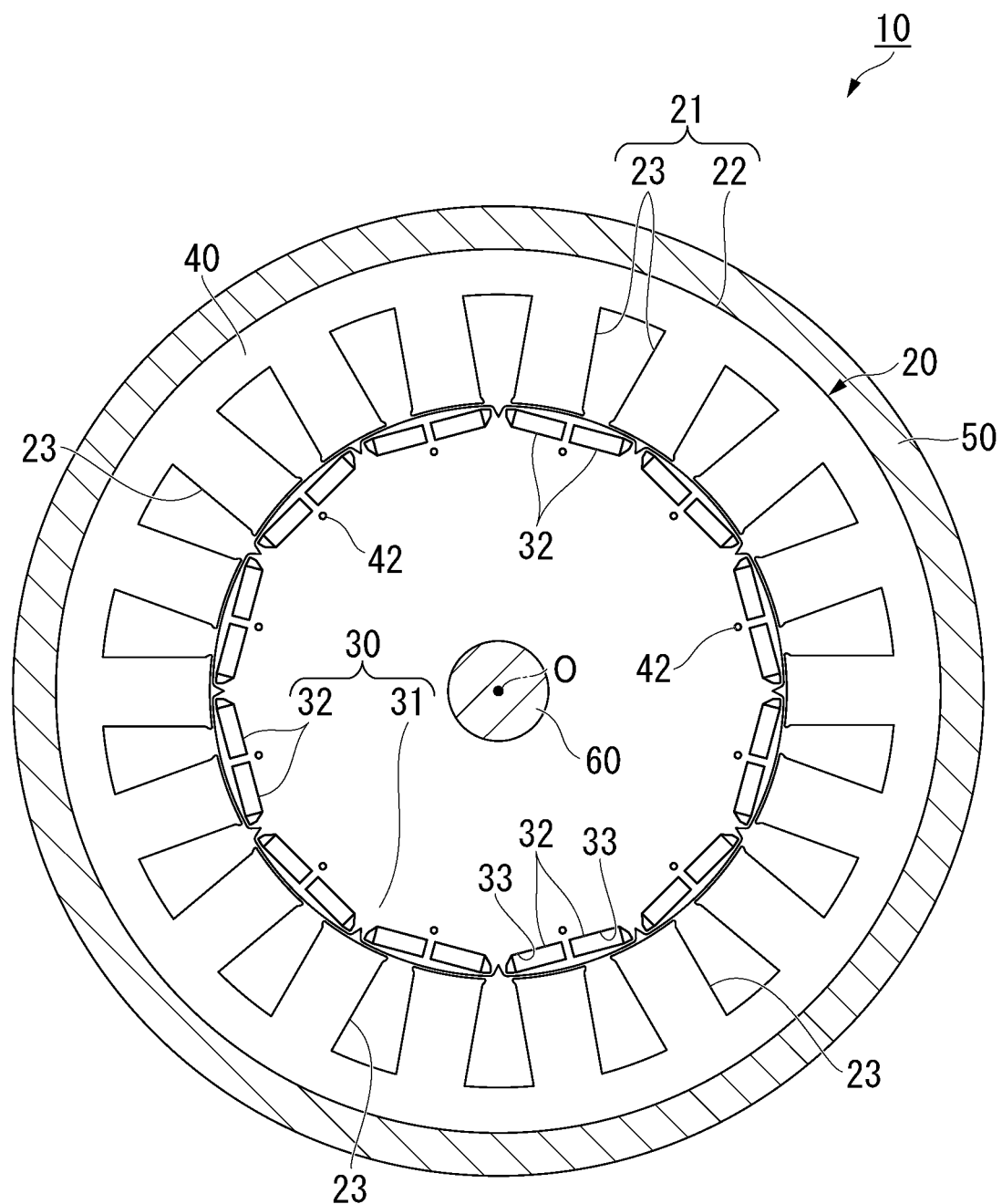
FIG. 1 is a cross-sectional view of an electric motor according to an embodiment of the present invention.
Figure 2:
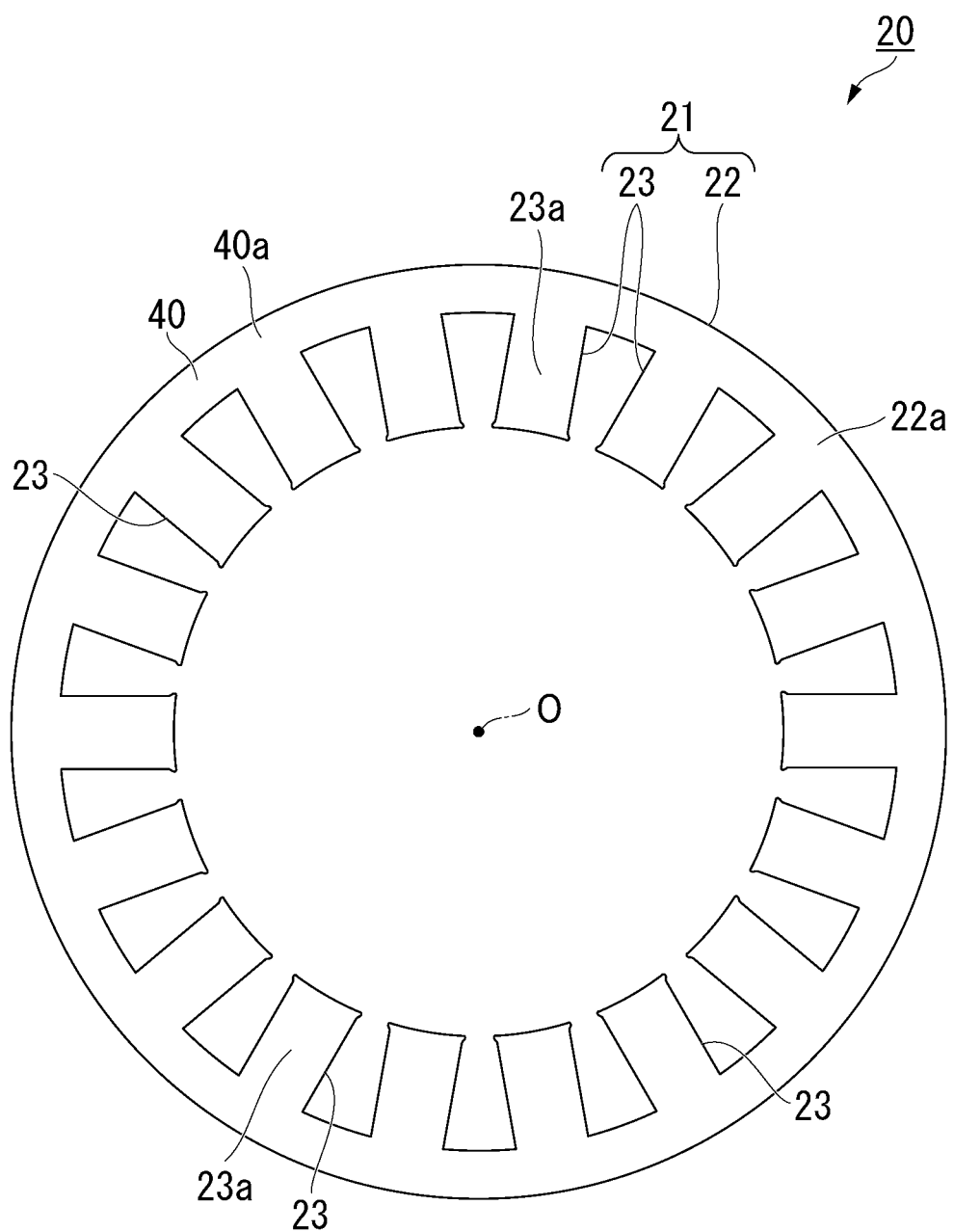
FIG. 2 is a plan view of a stator included in the electric motor shown in FIG. 1.

As shown in FIGS. 1 and 2, an electric motor 10 includes a stator 20, a rotor 30, a case 50, and a rotation shaft 60. The stator 20 and the rotor 30 are accommodated in the case 50. The stator 20 is fixed to the case 50.

In the present embodiment, as the electric motor 10, an inner rotor type electric motor in which the rotor 30 is located inside the stator 20 is adopted. However, as the electric motor 10, an outer rotor type electric motor in which the rotor 30 is located outside the stator 20 may be adopted. Further, in the present embodiment, the electric motor 10 is a 12-pole 18-slot three-phase AC motor. However, for example, the number of poles, the number of slots, the number of phases, and the like can be changed as appropriate.

The stator 20 includes a stator core 21 and a winding (not shown).

The stator core 21 includes an annular core back part 22 and a plurality of tooth parts 23. In the following, an axial direction (a direction of a central axis O of the stator core 21) of the stator core 21 (the core back part 22) is referred to as an axial direction, a radial direction (a direction orthogonal to the central axis O of the stator core 21) of the stator core 21 (the core back part 22) is referred to as a radial direction, and a circumferential direction (a direction of rotation around the central axis O of the stator core 21) of the stator core 21 (the core back part 22) is referred to as a circumferential direction.

The core back part 22 is formed in an annular shape in a plan view of the stator 20 when seen in the axial direction.

The plurality of tooth parts 23 protrude from the core back part 22 inward in the radial direction (toward the central axis O of the core back part 22 in the radial direction). The plurality of tooth parts 23 are disposed at equal intervals in the circumferential direction. In the present embodiment, 18 tooth parts 23 are provided at an interval of 20 degrees of a central angle centered on the central axis O. The plurality of tooth parts 23 are formed to have the same shape and the same size as each other.

The winding is wound around the tooth part 23. The winding may be a concentrated winding or a distributed winding.

The rotor 30 is disposed inside the stator 20 (the stator core 21) in the radial direction. The rotor 30 includes a rotor core 31 and a plurality of permanent magnets 32.

The rotor core 31 is formed in an annular shape (an annular ring) disposed coaxially with the stator 20. The rotation shaft 60 is disposed in the rotor core 31. The rotation shaft 60 is fixed to the rotor core 31.

The plurality of permanent magnets 32 are fixed to the rotor core 31. In the present embodiment, a set of two permanent magnets 32 forms one magnetic pole. The plurality of sets of permanent magnets 32 are disposed at equal intervals in the circumferential direction. In the present embodiment, 12 sets of (24 in total) permanent magnets 32 are provided at an interval of 30 degrees of the central angle centered on the central axis O.

In the present embodiment, an interior permanent magnet motor is adopted as a permanent magnetic electric motor.

A plurality of through-holes 33 which pass through the rotor core 31 in the axial direction are formed in the rotor core 31. The plurality of through-holes 33 are provided corresponding to the plurality of permanent magnets 32. Each of the permanent magnets 32 is fixed to the rotor core 31 in a state in which it is disposed in the corresponding through-hole 33. Each of the permanent magnets 32 is fixed to the rotor core 31, for example, by adhering an outer surface of the permanent magnet 32 and an inner surface of the through-hole 33 with an adhesive or the like. As the permanent magnetic electric motor, a surface permanent magnet motor may be adopted instead of an interior permanent magnet motor.

Both the stator core 21 and the rotor core 31 are laminated cores. The laminated core is formed by stacking a plurality of electrical steel sheets 40.

A stacking thickness of each of the stator core 21 and the rotor core 31 is, for example, 50.0 mm. An outer diameter of the stator core 21 is, for example, 250.0 mm. An inner diameter of the stator core 21 is, for example, 165.0 mm. An outer diameter of the rotor core 31 is, for example, 163.0 mm. An inner diameter of the rotor core 31 is, for example, 30.0 mm. However, these values are examples, and the stacking thickness, the outer diameter and the inner diameter of the stator core 21, and the stacking thickness, the outer diameter and the inner diameter of the rotor core 31 are not limited to these values. Here, the inner diameter of the stator core 21 is based on a tip end portion of the tooth part 23 of the stator core 21. The inner diameter of the stator core 21 is a diameter of a virtual circle inscribed in the tip end portions of all the tooth parts 23.

Each of the electrical steel sheets 40 forming the stator core 21 and the rotor core 31 is formed, for example, by punching an electrical steel sheet as a base material. As the electrical steel sheet 40, a known electrical steel sheet can be used. A chemical composition of the electrical steel sheet 40 is not particularly limited. In the present embodiment, a non-grain-oriented electrical steel sheet is adopted as the electrical steel sheet 40. As the non-grain-oriented electrical steel sheet, for example, a non-grain-oriented electrical steel strip of JIS C 2552:2014 can be adopted.

However, as the electrical steel sheet 40, it is also possible to adopt a grain-oriented electrical steel sheet instead of the non-grain-oriented electrical steel sheet. As the grain-oriented electrical steel sheet, for example, a grain-oriented electrical steel strip of JIS C 2553:2012 can be adopted.

Insulation coatings are provided on both surfaces of the electrical steel sheet 40 in order to improve workability of the electrical steel sheet and iron loss of the laminated core. For example, (1) an inorganic compound, (2) an organic resin, (3) a mixture of an inorganic compound and an organic resin, and the like can be applied as a substance constituting the insulation coating. Examples of the inorganic compound include (1) a complex of dichromate and boric acid, (2) a complex of phosphate and silica, and the like. Examples of the organic resin include an epoxy-based resin, an acrylic-based resin, an acrylic-styrene-based resin, a polyester-based resin, a silicone-based resin, a fluorine-based resin, and the like.

In order to ensure insulating performance between the electrical steel sheets 40 stacked with each other, a thickness of the insulation coating (a thickness per one surface of the electrical steel sheet 40) is preferably 0.1 μm or more.

On the other hand, an insulating effect saturates as the insulation coating becomes thicker. Further, as the insulation coating becomes thicker, a space factor decreases, and the performance as a laminated core deteriorates. Therefore, the insulation coating should be as thin as possible within a range in which the insulating performance is ensured. The thickness of the insulation coating (the thickness per one surface of the electrical steel sheet 40) is preferably 0.1 μm or more and 5 μm or less. The thickness of the insulation coating is more preferably 0.1 μm or more and 2 μm or less.

As the electrical steel sheet 40 becomes thinner, an effect of improving the iron loss gradually saturates. Further, as the electrical steel sheet 40 becomes thinner, manufacturing cost of the electrical steel sheet 40 increases. Therefore, the thickness of the electrical steel sheet 40 is preferably 0.10 mm or more in consideration of the effect of improving the iron loss and the manufacturing cost.

On the other hand, when the electrical steel sheet 40 is too thick, a press punching operation of the electrical steel sheet 40 becomes difficult.

Therefore, when considering the press punching operation of the electrical steel sheet 40, the thickness of the electrical steel sheet 40 is preferably 0.65 mm or less.

Further, as the electrical steel sheet 40 becomes thicker, the iron loss increases. Therefore, when considering iron loss characteristics of the electrical steel sheet 40, the thickness of the electrical steel sheet 40 is preferably 0.35 mm or less. The thickness of the electrical steel sheet 40 is more preferably 0.20 mm or 0.25 mm.

In consideration of the above points, the thickness of each of the electrical steel sheets 40 is, for example, 0.10 mm or more and 0.65 mm or less. The thickness of each of the electrical steel sheets 40 is preferably 0.10 mm or more and 0.35 mm or less, and more preferably 0.20 mm or 0.25 mm. The thickness of the electrical steel sheet 40 includes the thickness of the insulation coating.

Figure 3:
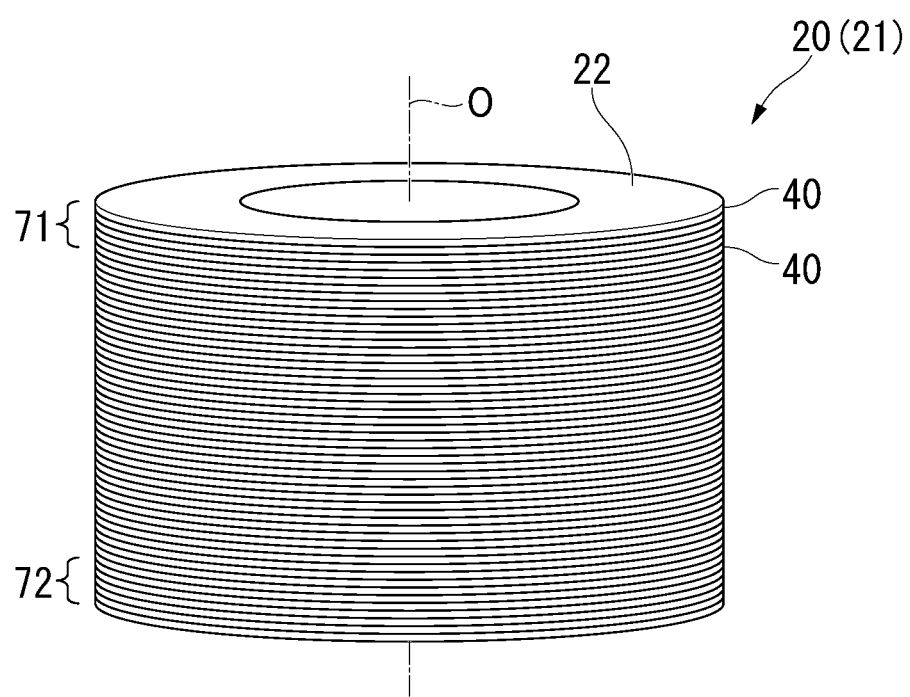
FIG. 3 is a perspective view of a laminated core according to an embodiment of the present invention.

As shown in FIG. 3, the plurality of electrical steel sheets 40 forming the stator core 21 are stacked in a thickness direction. The thickness direction is a thickness direction of the electrical steel sheet 40. The thickness direction corresponds to the stacking direction of the electrical steel sheets 40. In FIG. 3, for convenience, the tooth part 23 is not shown. The plurality of electrical steel sheets 40 are disposed coaxially with respect to the central axis O. The electrical steel sheet 40 includes a core back part 22 and a plurality of tooth parts 23.

Figure 4:
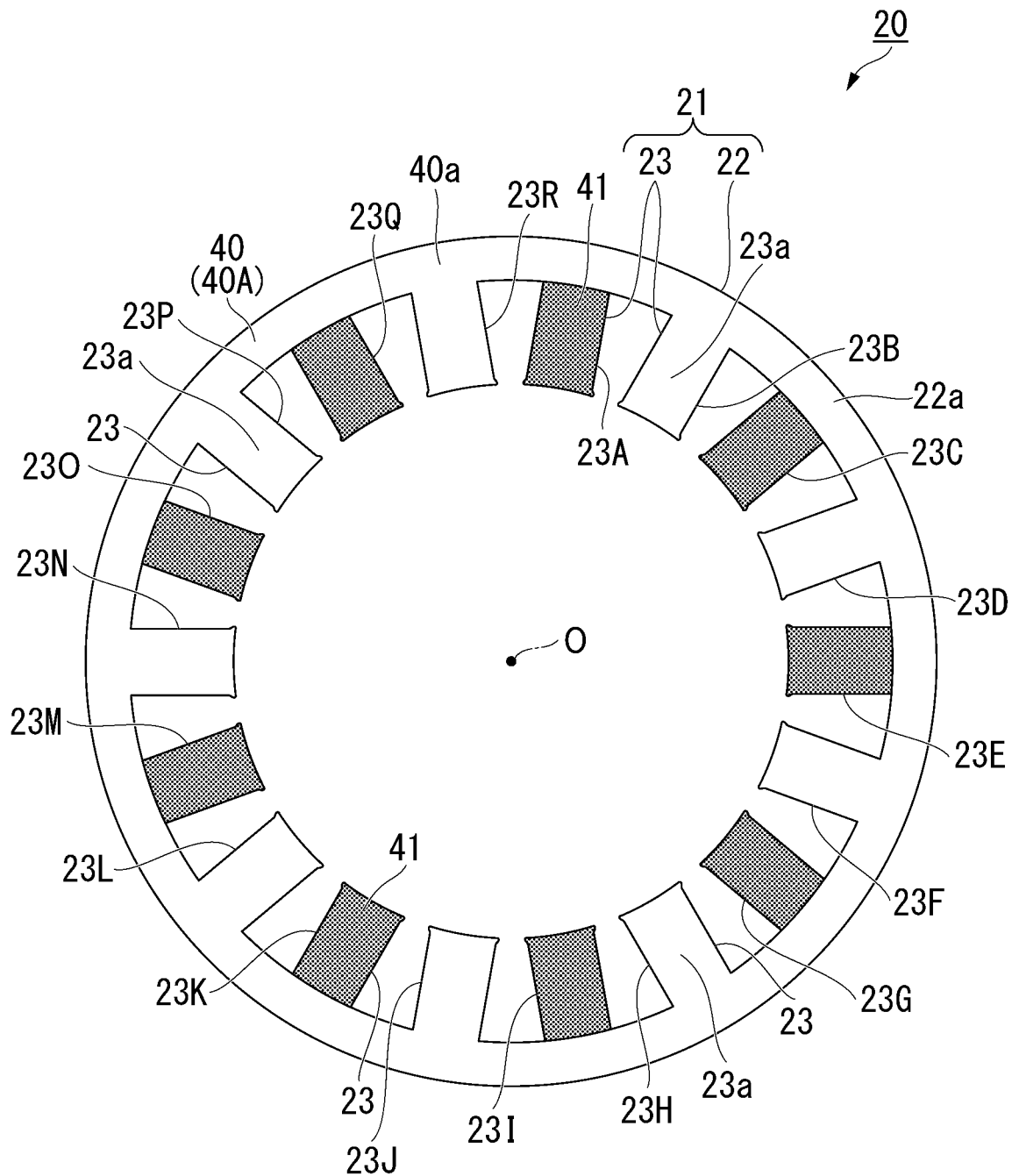
FIG. 4 is a plan view of the electrical steel sheet constituting the laminated core according to the embodiment of the present invention (in the case of N=1).
Figure 5:
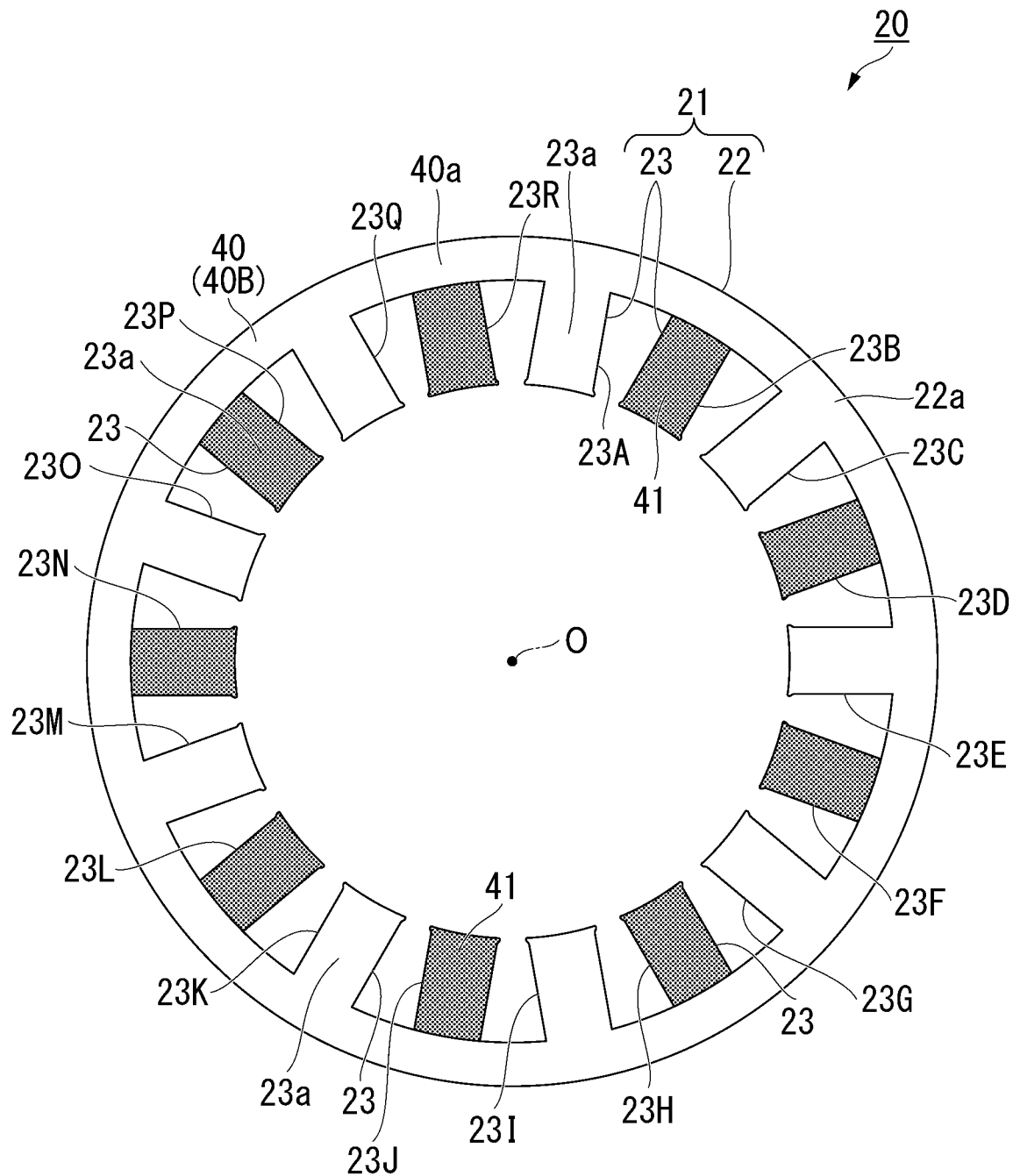
FIG. 5 is a plan view of the electrical steel sheet constituting the laminated core according to the embodiment of the present invention (in the case of N=1).

In the stator core 21, as shown in FIGS. 4 and 5, an adhesion part 41 for adhering the electrical steel sheets 40 is disposed between the electrical steel sheets 40 adjacent to each other in the stacking direction.

The adhesion part 41 partially adheres the electrical steel sheets 40 adjacent to each other in the stacking direction. The adhesion parts 41 adjacent to each other in the stacking direction have different arrangement regions in a plan view seen in the stacking direction. A range in which the adhesion parts 41 adjacent to each other in the stacking direction are disposed so that arrangement regions thereof are different from each other in a plan view seen in the stacking direction (hereinafter, referred to as an arrangement range in which the arrangement regions are different from each other) may be the entire stator core 21 and may be a part of the stator core 21. Specifically, the arrangement range in which the arrangement regions are different from each other may be in one of the plurality of tooth parts 23 arranged in the circumferential direction. The arrangement range in which the arrangement regions are different from each other may be in one of layers formed by the plurality of adhesion parts 41, which will be described later, arranged in the stacking direction.

Here, the arrangement region is a region on a surface (a first surface) 40a of the electrical steel sheet 40 on which the adhesion part 41 is disposed. That is, the arrangement region is an adhesion region on the surface 40a of the electrical steel sheet 40 on which the adhesion part 41 is provided. The adhesion region in which the adhesion part 41 is provided and a non-adhesion region in which the adhesion part 41 is not provided are formed on the surface 40a of the electrical steel sheet 40.

The adhesion region of the electrical steel sheet 40 in which the adhesion part 41 is provided means a region of the first surface 40a of the electrical steel sheet 40 in which the adhesive cured without being divided is provided.

Further, the non-adhesion region of the electrical steel sheet 40 in which the adhesion part 41 is not provided means a region on the first surface 40a of the electrical steel sheet 40 in which the adhesive cured without being divided is not provided.

Here, an adhesive which is cured without being divided between the electrical steel sheets 40 adjacent to each other in the stacking direction is referred to as one adhesion part 41.

Here, as shown in FIGS. 2, 4 and 5, a stacking surface of the core back part 22 is referred to as a surface 22a. A stacking surface of the tooth part 23 is referred to as a surface 23a. At this time, the adhesion part 41 is preferably provided on at least one of the surface 22a of the core back part 22 and the surface 23a of the tooth part 23 in the electrical steel sheet 40. That is, the adhesion part 41 may be provided only on the surface 22a of the core back part 22 in the electrical steel sheet 40. The adhesion part 41 may be provided only on the surface 23a of the tooth part 23 in the electrical steel sheet 40. The adhesion part 41 may be provided on both the surface 22a of the core back part 22 and the surface 23a of the tooth part 23 in the electrical steel sheet 40.

In the present embodiment, one or a plurality of adhesion parts 41 may form a layer (hereinafter, also referred to as a layer formed by the adhesion parts 41) between the two electrical steel sheets 40. In other words, the layer formed by the adhesion part 41 includes one or the plurality of adhesion parts 41. A plurality of layers formed by the adhesion part 41 are provided in the stacking direction.

Preferably, the adhesion part 41 is provided so that the arrangement regions overlap at an N-layer interval (N is a natural number) in a plan view seen in the stacking direction. The N-layer interval means an N-layer interval in the layers by the adhesion part 41. In other words, preferably, each of the adhesion parts 41 is disposed at the same position in the electrical steel sheet 40 at the N-layer interval (N is a natural number) in the layers formed by the adhesion part 41. In a plan view seen in the stacking direction, preferably, the arrangement regions of the adhesion part 41 overlap at the N-layer interval over the entire length of the stator core 21 in the stacking direction.

The fact that the arrangement regions of the adhesion part 41 overlap at the N-layer interval in the plan view seen in the stacking direction means that the arrangement regions of the adhesion part 41 overlap at the N-layer interval in the plan view seen in the stacking direction at least some of the layers formed by the plurality of adhesion parts 41 arranged in the stacking direction in one of the plurality of tooth parts 23 arranged in the circumferential direction.

Further, N is preferably 1 or a prime number. In the present embodiment, N=1.

In the present embodiment, a case in which the adhesion part 41 is provided only on the surface 23a of the tooth part 23 is shown. Hereinafter, the plurality of tooth parts 23 included in each of the electrical steel sheets 40 are also referred to as tooth parts 23A to 23R in the clockwise order as shown in FIGS. 4 and 5. The plurality of electrical steel sheets 40 included in the stator core 21 are also referred to as electrical steel sheets 400, 40A, 40B, . . . in the order from the first side in the stacking direction to the second side opposite to the first side in the stacking direction (refer to FIG. 8). The adhesion parts 41 are disposed at positions adjacent to the first side in the stacking direction with respect to the electrical steel sheets 40A, 40B, . . . . The adhesion part 41 is not disposed at a position adjacent to the first side in the stacking direction with respect to the electrical steel sheet 400. The adhesion part 41 is disposed at a position adjacent to the second side in the stacking direction with respect to the electrical steel sheet 400.

In the following, the adhesion part 41 disposed (provided) on the electrical steel sheet 40 means the adhesion part 41 disposed at a position adjacent to the first side in the stacking direction with respect to the electrical steel sheet 40.

The tooth parts 23A of the electrical steel sheets 40 overlap each other in a plan view seen in the stacking direction. The same applies to the tooth parts 23B to 23R of each of the electrical steel sheets 40.

When N=1, as shown in FIG. 4, in the electrical steel sheet 40A, the adhesion part 41 is provided on the surface 23a of each of the tooth parts 23A, 23C, 23E, 23G, 23I, 23K, 23M, 23O, and 23Q. Further, as shown in FIG. 5, in the electrical steel sheet 40B adjacent to the electrical steel sheet 40A in the stacking direction, the adhesion part 41 is provided on the surface 23a of each of the tooth parts 23B, 23D, 23F, 23H, 23J, 23L, 23N, 23P, and 23R. Each of the adhesion parts 41 is formed in a strip shape in a plan view and is disposed along an exterior of the tooth part 23.

An arrangement pattern of another adhesion part 41 in the stator core 21 is exemplified.

Figure 6:
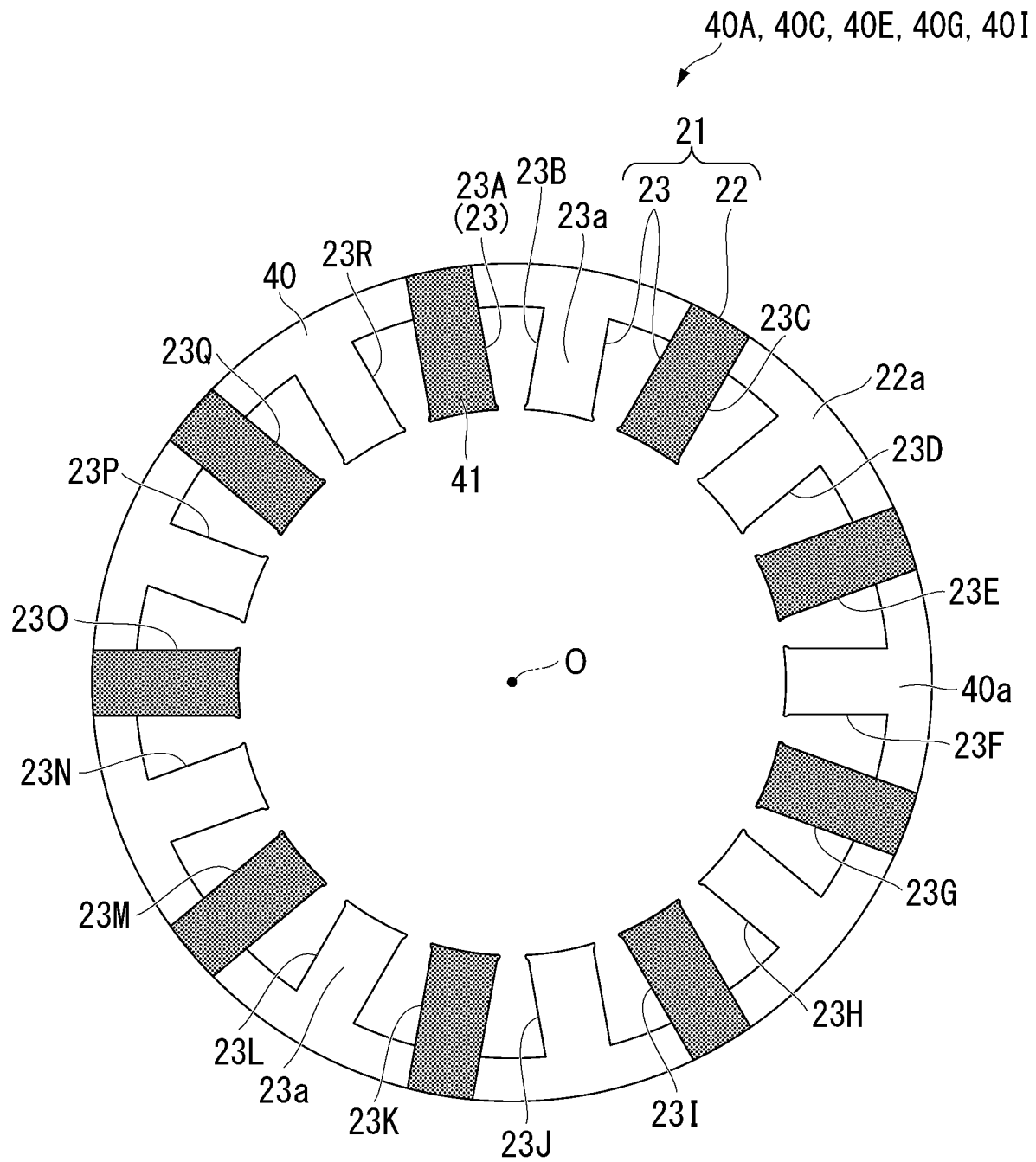
FIG. 6 is a plan view of the electrical steel sheet constituting the laminated core according to the embodiment of the present invention (in the case of N=1).
Figure 7:
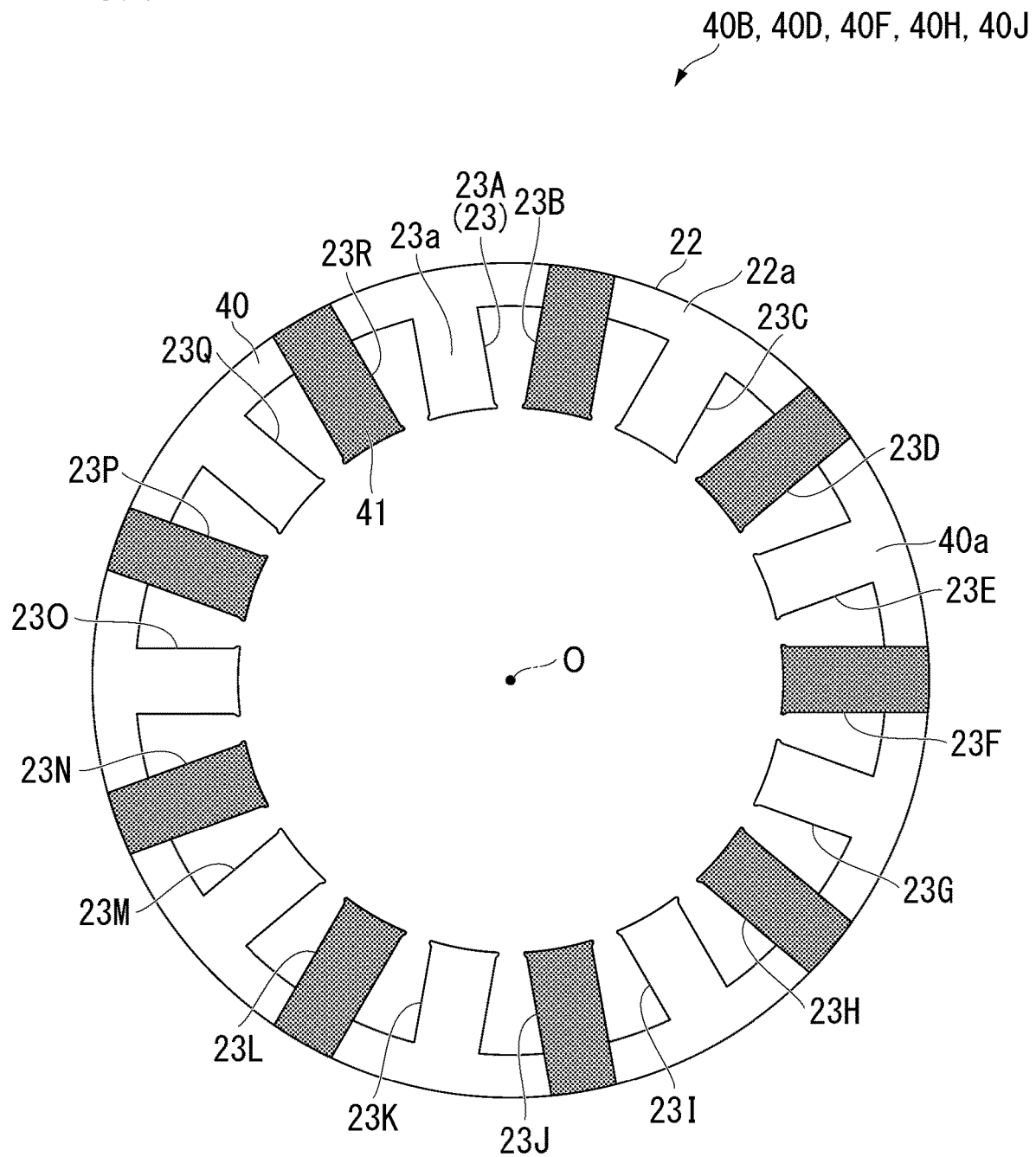
FIG. 7 is a plan view of the electrical steel sheet constituting the laminated core according to the embodiment of the present invention (in the case of N=1).

As shown in FIGS. 6 and 7, in this example, 18 tooth parts 23 (23A to 23R) are provided at an interval of 20 degrees of a central angle centered on the central axis O.

In the electrical steel sheet 40A, each of the adhesion parts 41 extends from the surface 23a of each of the tooth parts 23A, 23C, 23E, 23G, 23I, 23K, 23M, 23O, and 23Q to an outer peripheral edge of the core back part 22 in the radial direction along the tooth parts 23. In the electrical steel sheet 40B, each of the adhesion parts 41 extends from the surface 23a of each of the tooth parts 23B, 23D, 23F, 23H, 23J, 23L, 23N, 23P, and 23R to an outer peripheral edge of the core back part 22 in the radial direction along the tooth parts 23.

Figure 8:
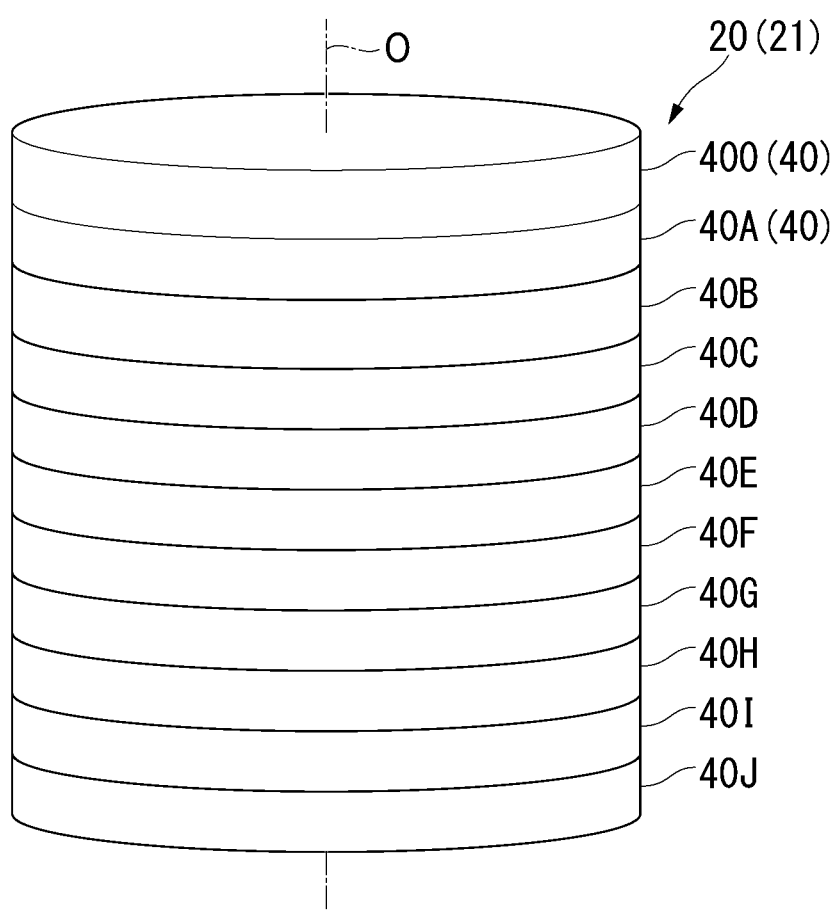
FIG. 8 is a perspective view of a laminated core according to an embodiment of the present invention.

Further, as shown in FIG. 8, in the stator core 21 of this example, 11 electrical steel sheets 40 (40O to 40J) are stacked. In the following, for ease of explanation, the stator core 21 including 11 electrical steel sheets 40 will be described as an example. However, the stator core 21 may include 12 or more electrical steel sheets 40.

The case of the stator core 21 in which N=1 is shown in FIGS. 6 and 7 and Table 1. In this case, the adhesion parts 41 are provided so that the arrangement regions overlap at a one-layer interval in the plan view seen in the stacking direction. In Table 1, a portion marked with ○ (a column in which ○ is described) indicates an outer portion (hereinafter, referred to as a core back outer part of the tooth part 23) of the tooth part 23 in the radial direction in (1) the tooth part 23 on which the adhesion part 41 is disposed and (2) the core back part 22 on which the adhesion part 41 is disposed. In the following, the tooth part 23 and the core back outer part of the tooth part 23 will also be referred to as the tooth part 23 and the like.

Corresponding to the column in which ○ is described, the adhesion part 41 may be disposed only on one of the tooth part 23 and the core back outer part of the tooth part 23.

The stator core 21 of this example includes the electrical steel sheet 40O. However, as will be described later, since the adhesion part 41 is not disposed on the electrical steel sheet 40O, the electrical steel sheet 40O is not shown in Table 1. Also in Tables 2 to 5 which will be described later, the electrical steel sheet 40O is not shown in each of the tables.

For example, in Table 1, ○ is shown in the column of the tooth part 23A of the electrical steel sheet 40A. This description means that the adhesion part 41 is disposed at a position adjacent to the first side in the stacking direction with respect to the tooth part 23A of the electrical steel sheet 40A. This description further means that the adhesion part 41 is disposed at a position adjacent to the first side in the stacking direction with respect to the core back outer part of the tooth part 23A of the electrical steel sheet 40A. Hereinafter, the layer formed by the adhesion part 41 disposed on the first side in the stacking direction with respect to the electrical steel sheet 40A is referred to as a layer formed by the adhesion part 41 corresponding to the electrical steel sheet 40A. The same is applied to the electrical steel sheets 40B to 40J.

On the other hand, ○ is not described in the column of the tooth part 23A of the electrical steel sheet 40B. This description means that the adhesion part 41 is not disposed at a position adjacent to the first side in the stacking direction with respect to the tooth part 23A of the electrical steel sheet 40B. This description further means that the adhesion part 41 is not disposed at a position adjacent to the first side in the stacking direction with respect to the core back outer part of the tooth part 23A of the electrical steel sheet 40B.

In the case of the stator core 21 in which N=1, as shown in FIG. 6 and Table 1, in the electrical steel sheets 40A, 40C, 40E, 40G, and 40I, the adhesion part 41 is provided on the surface 23a of each of the tooth parts 23 of a first group which will be described later and the surface 22a of a radial outer portion of each of the tooth parts 23 of the first group in the core back part 22. The tooth parts 23 of the first group referred to here mean the tooth parts 23A, 23C, 23E, 23G, 23I, 23K, 23M, 23O, and 23Q.

Further, as shown in FIG. 7 and Table 1, in the electrical steel sheets 40B, 40D, 40F, 40H, and 40J, the adhesion part 41 is provided on the surface 23a of each of the tooth parts 23 of a second group which will be described later and the surface 22a of a radial outer portion of each of the tooth parts 23 of the second group in the core back part 22. The tooth parts 23 of the second group referred to here mean the tooth parts 23B, 23D, 23F, 23H, 23J, 23L, 23N, 23P, and 23R.

In this example, two types of layers formed by adhesion parts 41 having different shapes in a plan view are provided in the stator core 21. The layers formed by two types of adhesion parts 41 correspond to the tooth parts 23 of the first group and the tooth parts 23 of the second group. Here, among the layers formed by the two types of adhesion parts 41, the layers formed by the adhesion parts 41 having different shapes in the plan view are referred to as a layer formed by a first type of adhesion part 41 and a layer formed by a second type of adhesion part 41.

In all the layers formed by the two types of adhesion parts 41, the adhesion parts 41 are disposed on the tooth parts 23 and the like at an interval of one tooth part 23 in the circumferential direction.

However, for example, when the adhesion part 41 is disposed on the tooth part 23A and the like in the layer formed by the first type of adhesion part 41, the adhesion part 41 is not disposed on the tooth part 23A and the like in the layer formed by the second type of adhesion part 41. On the other hand, when the adhesion part 41 is not disposed on the tooth part 23A and the like in the layer formed by the first type of adhesion part 41, the adhesion part 41 is disposed on the tooth part 23A and the like of the layer formed by the second type of adhesion part 41. The same is applied to the tooth parts 23B to 23R.

Then, the layers formed by the two types of adhesion parts 41 are alternately disposed in the stacking direction. In other words, shapes of the layers formed by the adhesion part 41 in the plan view are the same at a one-layer interval.

When 12 or more electrical steel sheets 40 are stacked (provided) in the stator core 21, the stator core 21 is configured as follows. That is, another electrical steel sheet 40A is stacked next to the electrical steel sheet 40J (at a position adjacent to the second side in the stacking direction with respect to the electrical steel sheet 40J). Hereinafter, the other electrical steel sheets 40B to 40J are stacked in this order at positions adjacent to the second side in the stacking direction with respect to the other electrical steel sheet 40A.

TABLE 1

|  | 23A | 23B | 23C | 23D | 23E | 23F | 23G | 23H | 23I | 23J | 23K | 23L | 23M | 23N | 23O | 23P | 23Q | 23R |
|---|---|---|---|---|---|---|---|---|---|---|---|---|---|---|---|---|---|---|
| 40A | ○ |  | ○ |  | ○ |  | ○ | ○ |  | ○ |  | ○ |  | ○ |  | ○ |  |  |
| 40B |  | ○ |  | ○ |  | ○ |  | ○ | ○ |  | ○ |  | ○ |  | ○ |  | ○ |  |
| 40C | ○ |  | ○ |  | ○ |  | ○ |  | ○ | ○ |  | ○ |  | ○ |  | ○ |  | ○ |
| 40D |  | ○ |  | ○ |  | ○ |  | ○ |  | ○ | ○ |  | ○ |  | ○ |  | ○ |  |
| 40E | ○ |  | ○ |  | ○ |  | ○ |  | ○ |  | ○ | ○ |  | ○ |  | ○ |  |  |
| 40F |  | ○ |  | ○ |  | ○ |  | ○ |  | ○ |  | ○ | ○ |  | ○ |  | ○ |  |
| 40G | ○ |  | ○ |  | ○ |  | ○ |  | ○ |  | ○ |  | ○ | ○ |  | ○ |  |  |
| 40H |  | ○ |  | ○ |  | ○ |  | ○ |  | ○ |  | ○ |  | ○ | ○ |  | ○ |  |
| 40I | ○ |  | ○ |  | ○ |  | ○ |  | ○ |  | ○ |  | ○ |  | ○ | ○ |  |  |
| 40J |  | ○ |  | ○ |  | ○ |  | ○ |  | ○ |  | ○ |  | ○ |  | ○ | ○ |  |

Figure 9:
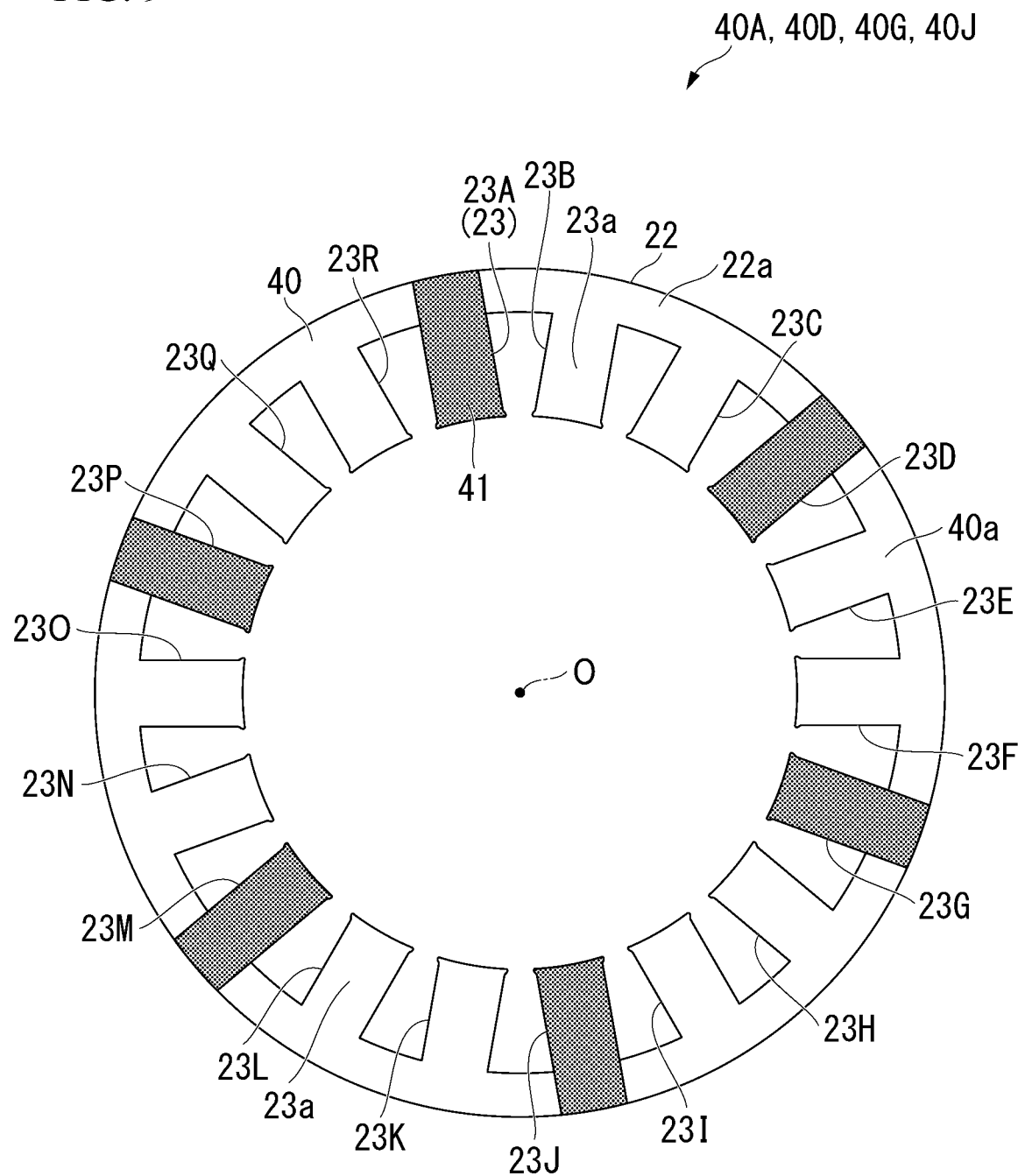
FIG. 9 is a plan view of the electrical steel sheet constituting the laminated core according to the embodiment of the present invention (in the case of N=2).
Figure 10:
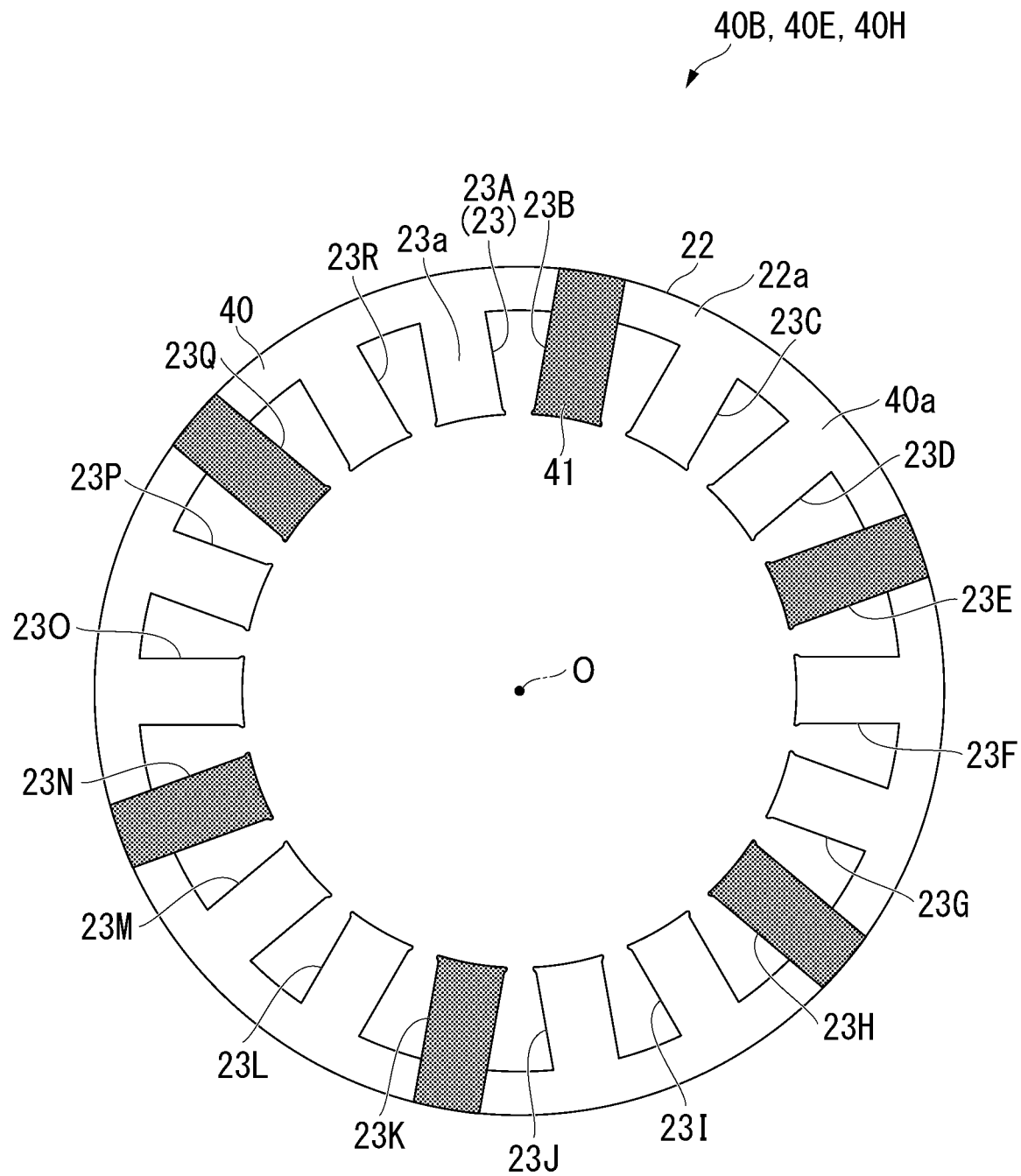
FIG. 10 is a plan view of the electrical steel sheet constituting the laminated core according to the embodiment of the present invention (in the case of N=2).
Figure 11:
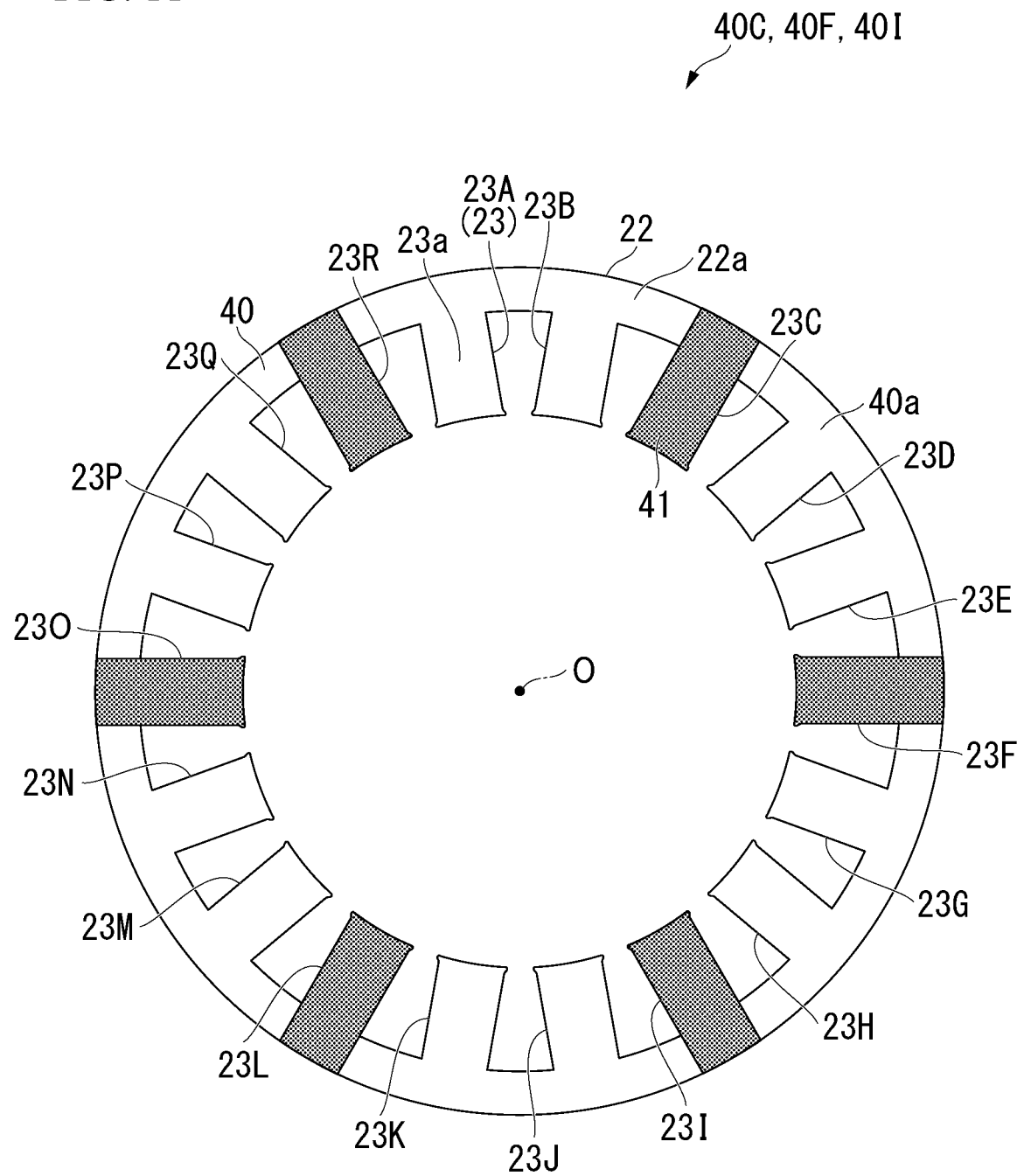
FIG. 11 is a plan view of the electrical steel sheet constituting the laminated core according to the embodiment of the present invention (in the case of N=2).

A case of the stator core 21 in which N=2 (a prime number) is shown in FIGS. 9 to 11 and Table 2. In this case, the adhesion part 41 is provided so that the arrangement regions overlap at a two-layer interval in a plan view seen in the stacking direction. In Table 2, a portion marked with ○ indicates the tooth part 23 on which the adhesion part 41 is disposed and the outer portion of the tooth part 23 in the radial direction in the core back part 22 (the tooth part 23 and the like).

In the case of the stator core 21 in which N=2 (a prime number), as shown in FIG. 9 and Table 2, in the electrical steel sheets 40A, 40D, 40G and 40J, the adhesion part 41 is provided on the surface 23a of each of the tooth parts 23 of a sixth group which will be described later, and the surface 22a of the radial outer portion of each of the tooth part 23 of the sixth group in the core back part 22. The tooth parts 23 of the sixth group referred to here mean the tooth parts 23A, 23D, 23G, 23J, 23M, and 23P.

Further, as shown in FIG. 10 and Table 2, in the electrical steel sheets 40B, 40E, and 40H, the adhesion part 41 is provided on the surface 23a of each of the tooth parts 23 of a seventh group which will be described later, and the surface 22a of the radial outer portion of each of the tooth part 23 of the seventh group in the core back part 22. The tooth parts 23 of the seventh group referred to here mean the tooth parts 23B, 23E, 23H, 23K, 23N, and 23Q.

Further, as shown in FIG. 11 and Table 2, in the electrical steel sheets 40C, 40F, and 40I, the adhesion part 41 is provided on the surface 23a of each of the tooth parts 23 of an eighth group which will be described later, and the surface 22a of the radial outer portion of each of the tooth part 23 of the eighth group in the core back part 22. The tooth parts 23 of the eighth group referred to here mean the tooth parts 23C, 23F, 23I, 23L, 23O, and 23R.

In this example, three types of layers formed by adhesion parts 41 having different shapes in a plan view are provided in the stator core 21. The layers formed by three types of adhesion parts 41 corresponds to the tooth parts 23 of the sixth group, the tooth parts 23 of the seventh group, and the tooth parts 23 of the eighth group.

In all the layers formed by the three types of adhesion parts 41, the adhesion parts 41 are disposed on the tooth parts 23 and the like at an interval of two tooth parts 23 in the circumferential direction. Here, among the layers formed by the three types of adhesion parts 41, the layers formed by the adhesion parts 41 having different shapes in the plan view are referred to as a layer formed by a first type of adhesion part 41, a layer formed by a second type adhesion part 41, and a layer formed by a second type of adhesion part 41.

The tooth part 23 and the like on which the adhesion part 41 is disposed in the layer formed by the second type of adhesion part 41 are shifted to the first side by one tooth part 23 and the like in the circumferential direction with respect to the tooth part 23 and the like on which the adhesion part 41 is disposed in the layer formed by the first type of adhesion part 41. The tooth part 23 and the like on which the adhesion part 41 is disposed in the layer formed by the third type of adhesion part 41 are shifted to the first side by one tooth part 23 and the like in the circumferential direction with respect to the tooth part 23 and the like on which the adhesion part 41 is disposed in the layer formed by the second type of adhesion part 41.

Then, the layer by the first type of adhesion part 41, the layer by the second type of adhesion part 41, and the layer by the third type of adhesion part 41 are disposed in order from the first side to the second side in the stacking direction. In other words, the shapes of the layers formed by the adhesion part 41 in the plan view are the same at a two-layer interval.

When 12 or more electrical steel sheets 40 are stacked in the stator core 21, the stator core 21 is configured as follows. That is, another electrical steel sheet 40A is stacked next to the electrical steel sheet 40J. Hereinafter, the other electrical steel sheets 40B to 40J are stacked in this order at positions adjacent to the second side in the stacking direction with respect to the other electrical steel sheet 40A.

However, when another electrical steel sheet 40A is stacked next to the electrical steel sheet 40J, the other electrical steel sheet 40A is disposed in a state in which it rotates around the central axis O with respect to the electrical steel sheet 40J so that the tooth part 23C of the other electrical steel sheet 40A overlaps the tooth part 23A of the electrical steel sheet 40J.

TABLE 2

|  | 23A | 23B | 23C | 23D | 23E | 23F | 23G | 23H | 23I | 23J | 23K | 23L | 23M | 23N | 23O | 23P | 23Q | 23R |
|---|---|---|---|---|---|---|---|---|---|---|---|---|---|---|---|---|---|---|
| 40A | ○ |  |  | ○ |  |  | ○ |  |  | ○ |  |  | ○ |  |  | ○ |  |  |
| 40B |  | ○ |  |  | ○ |  |  | ○ |  |  | ○ |  |  | ○ |  |  | ○ |  |
| 40C |  |  | ○ |  |  | ○ |  |  | ○ |  |  | ○ |  |  | ○ |  |  | ○ |
| 40D | ○ |  |  | ○ |  |  | ○ |  |  | ○ |  |  | ○ |  |  | ○ |  |  |
| 40E |  | ○ |  |  | ○ |  |  | ○ |  |  | ○ |  |  | ○ |  |  | ○ |  |
| 40F |  |  | ○ |  |  | ○ |  |  | ○ |  |  | ○ |  |  | ○ |  |  | ○ |
| 40G | ○ |  |  | ○ |  |  | ○ |  |  | ○ |  |  | ○ |  |  | ○ |  |  |

TABLE 2-continued

|     | 23A | 23B | 23C | 23D | 23E | 23F | 23G | 23H | 23I | 23J | 23K | 23L | 23M | 23N | 23O | 23P | 23Q | 23R |
|-----|-----|-----|-----|-----|-----|-----|-----|-----|-----|-----|-----|-----|-----|-----|-----|-----|-----|-----|
| 40H |     | ○   |     | ○   |     |     | ○   |     |     |     | ○   |     |     | ○   |     |     | ○   |     |
| 40I |     |     | ○   |     | ○   |     |     | ○   |     |     |     | ○   |     |     | ○   |     |     | ○   |
| 40J | ○   |     |     | ○   |     | ○   |     |     |     |     |     | ○   |     |     | ○   |     |     |     |

A case of the stator core 21 in which N=7 (a prime number) is shown in FIGS. 12 to 21 and Table 3. In this case, in some tooth parts 23 among the plurality of tooth parts 23 arranged in the circumferential direction, the adhesion parts 41 are provided so that the arrangement regions overlap at a seven-layer interval in a plan view seen in the stacking direction. In Table 3, a portion marked with ○ indicates the tooth part 23 on which the adhesion part 41 is disposed and the outer portion of the tooth part 23 in the radial direction in the core back part 22 on which the adhesion part 41 is disposed (the tooth part 23 and the like).

Figure 12:
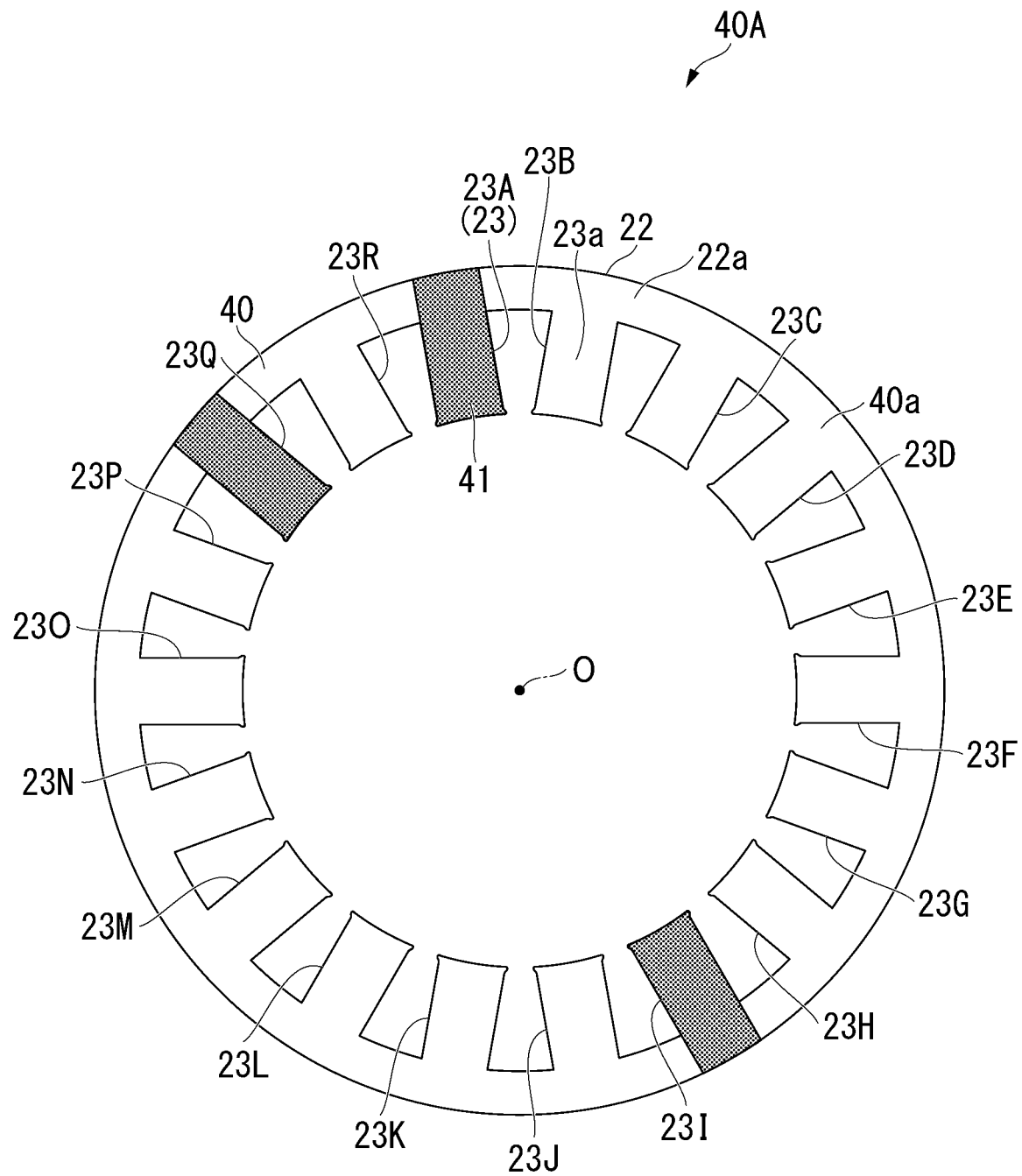
FIG. 12 is a plan view of the electrical steel sheet constituting the laminated core according to the embodiment of the present invention (in the case of N=7).

When N=7 (a prime number), as shown in FIG. 12 and Table 3, in the electrical steel sheets 40A and 40I, the adhesion part 41 is provided on the surface 23a of each of the tooth parts 23 of an eleventh group which will be described later and the surface 22a of the radial outer portion of each of the tooth parts 23 of the eleventh group in the core back part 22. The tooth parts 23 of the eleventh group referred to here mean the tooth parts 23A, 23I, and 23Q.

Figure 13:
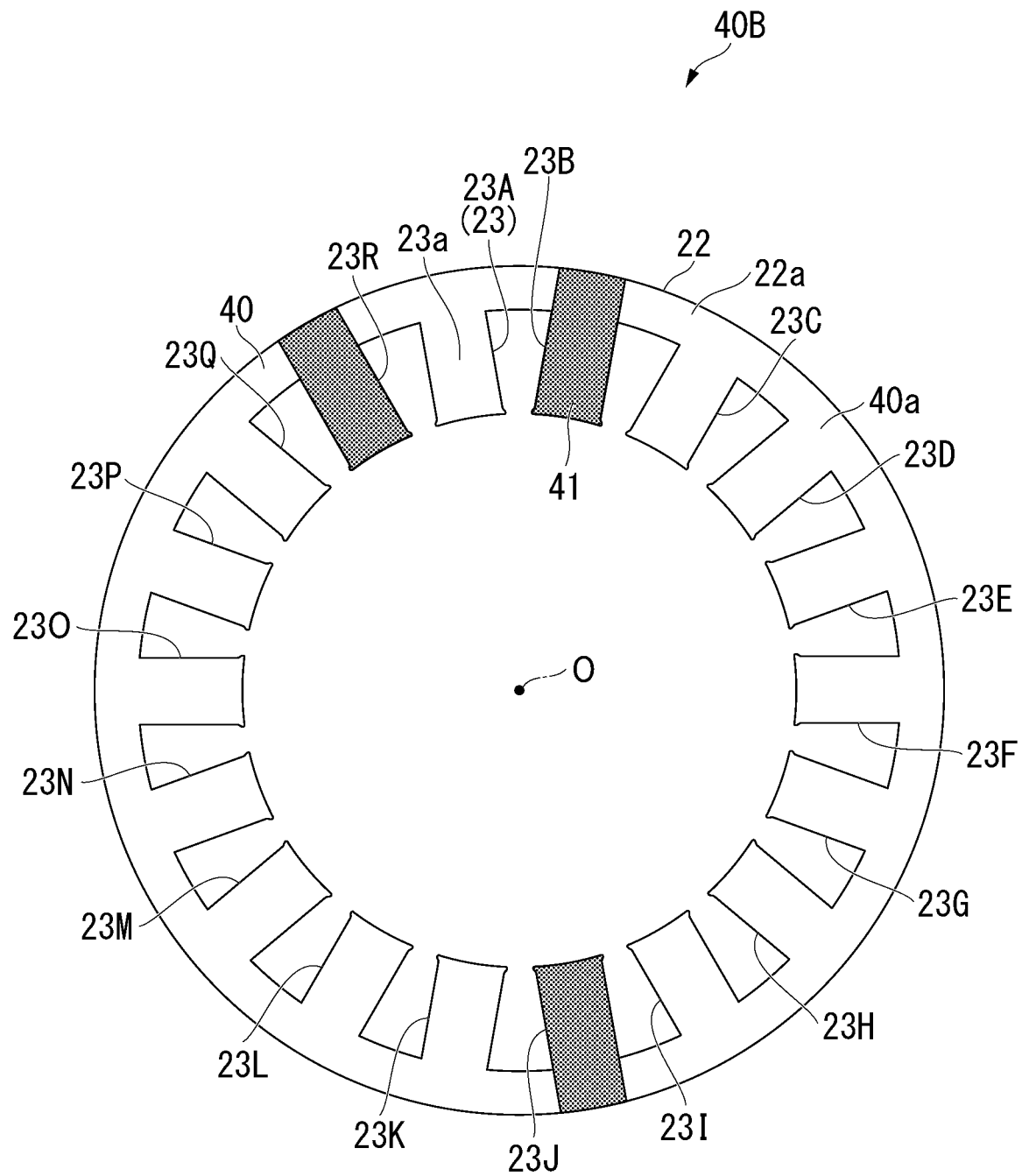
FIG. 13 is a plan view of the electrical steel sheet constituting the laminated core according to the embodiment of the present invention (in the case of N=7).

Further, as shown in FIG. 13 and Table 3, in the electrical steel sheets 40B and 40J, the adhesion part 41 is provided on the surface 23a of each of the tooth parts 23 of a twelfth group which will be described later and the surface 22a of the radial outer portion of each of the tooth parts 23 of the twelfth group in the core back part 22. The tooth parts 23 of the eleventh group referred to here mean the tooth parts 23B, 23J, and 23R.

Figure 14:
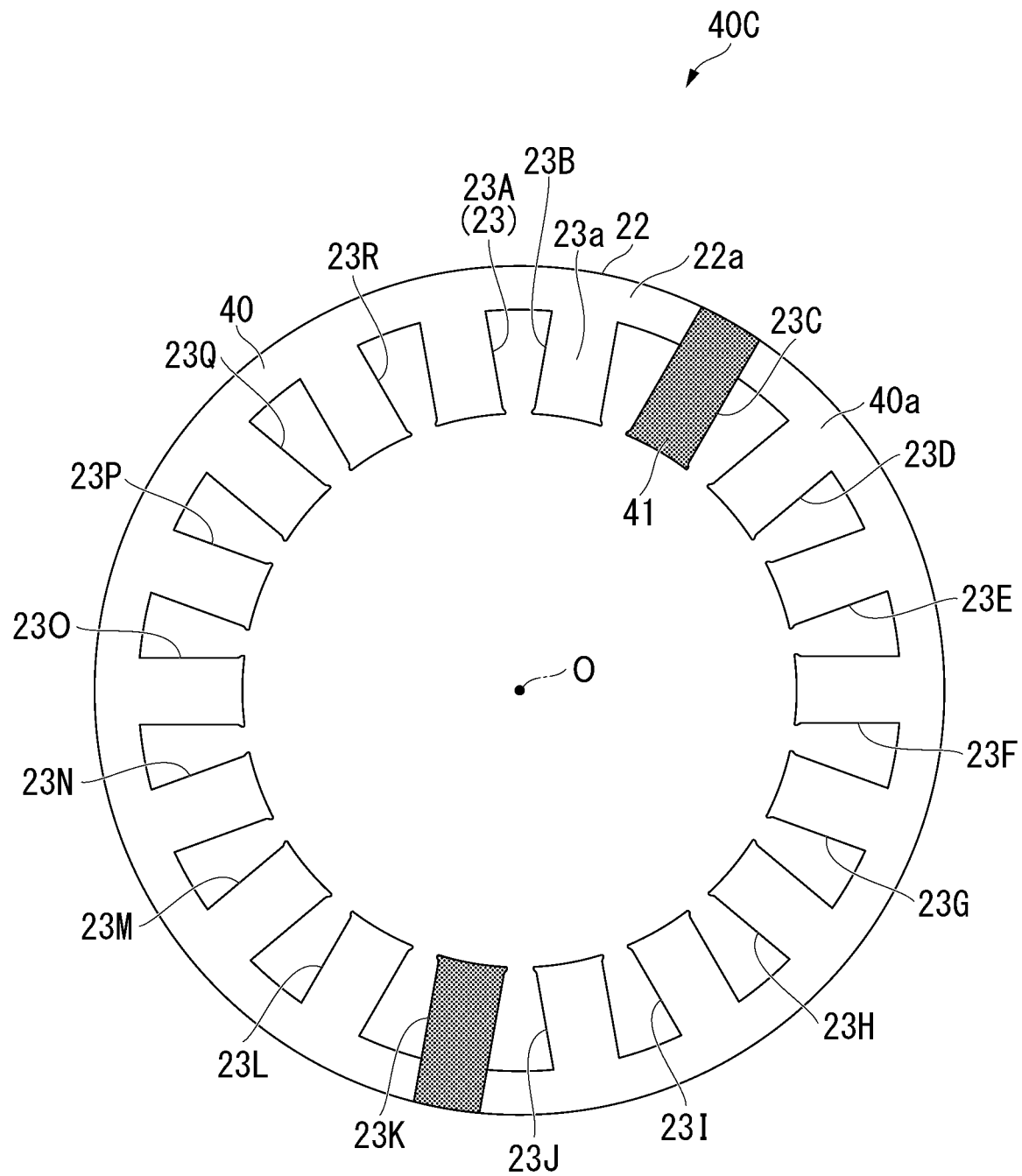
FIG. 14 is a plan view of the electrical steel sheet constituting the laminated core according to the embodiment of the present invention (in the case of N=7).

Further, as shown in FIG. 14 and Table 3, in the electrical steel sheet 40C, the adhesion part 41 is provided on the surface 23a of each of the tooth parts 23 of a thirteenth group which will be described later and the surface 22a of the radial outer portion of each of the tooth parts 23 of the thirteenth group in the core back part 22. The tooth parts 23 of the thirteenth group referred to here mean the tooth parts 23C and 23K.

Figure 15:
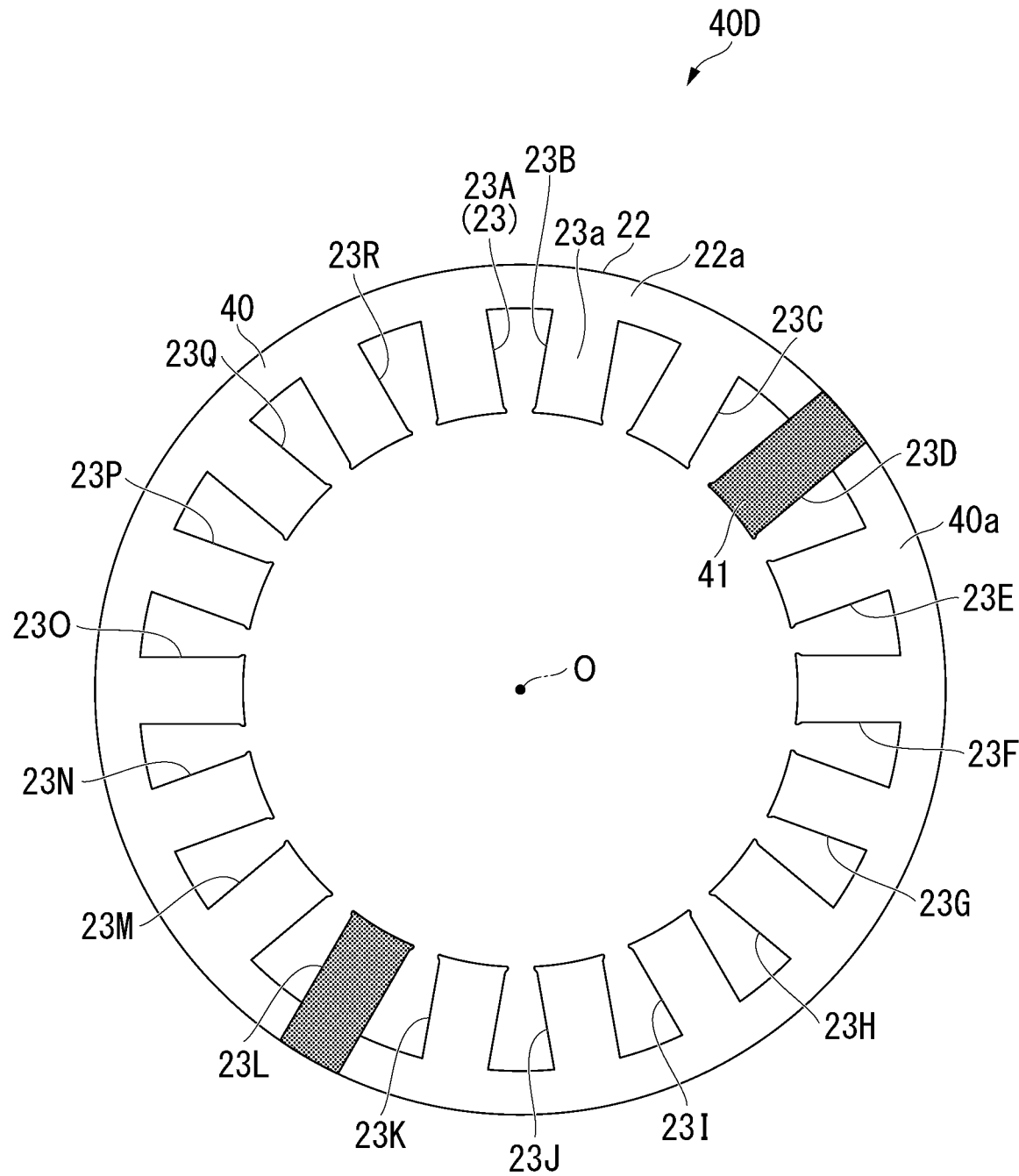
FIG. 15 is a plan view of the electrical steel sheet constituting the laminated core according to the embodiment of the present invention (in the case of N=7).

Further, as shown in FIG. 15 and Table 3, in the electrical steel sheet 40D, the adhesion part 41 is provided on the surface 23a of each of the tooth parts 23 of a fourteenth group which will be described later and the surface 22a of the radial outer portion of each of the tooth parts 23 of the fourteenth group in the core back part 22. The tooth parts 23 of the fourteenth group referred to here mean the tooth parts 23D and 23L.

Figure 16:
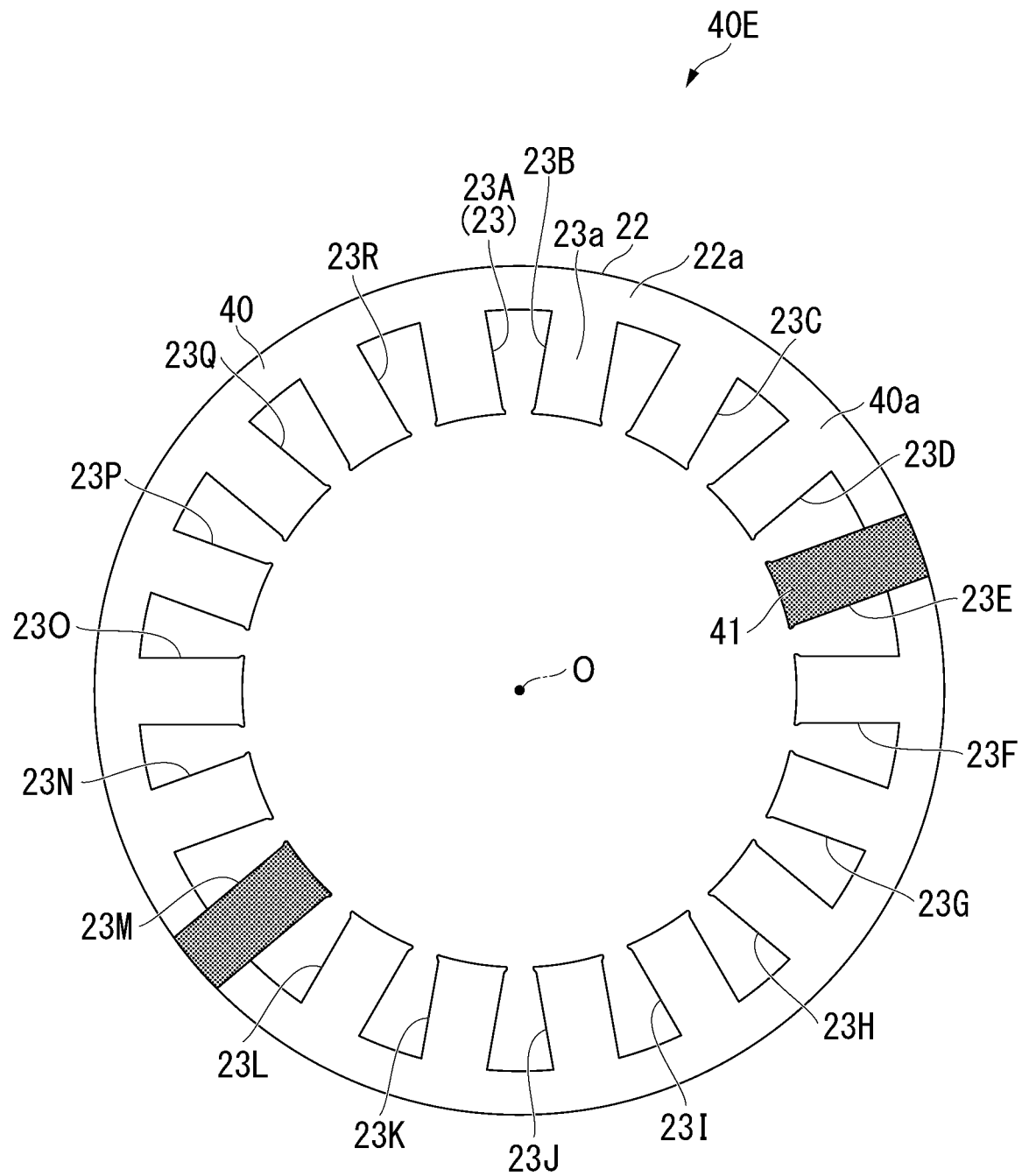
FIG. 16 is a plan view of the electrical steel sheet constituting the laminated core according to the embodiment of the present invention (in the case of N=7).

Further, as shown in FIG. 16 and Table 3, in the electrical steel sheet 40E, the adhesion part 41 is provided on the surface 23a of each of the tooth parts 23 of a fifteenth group which will be described later and the surface 22a of the radial outer portion of each of the tooth parts 23 of the fifteenth group in the core back part 22. The tooth parts 23 of the fifteenth group referred to here mean the tooth parts 23E and 23M.

Figure 17:
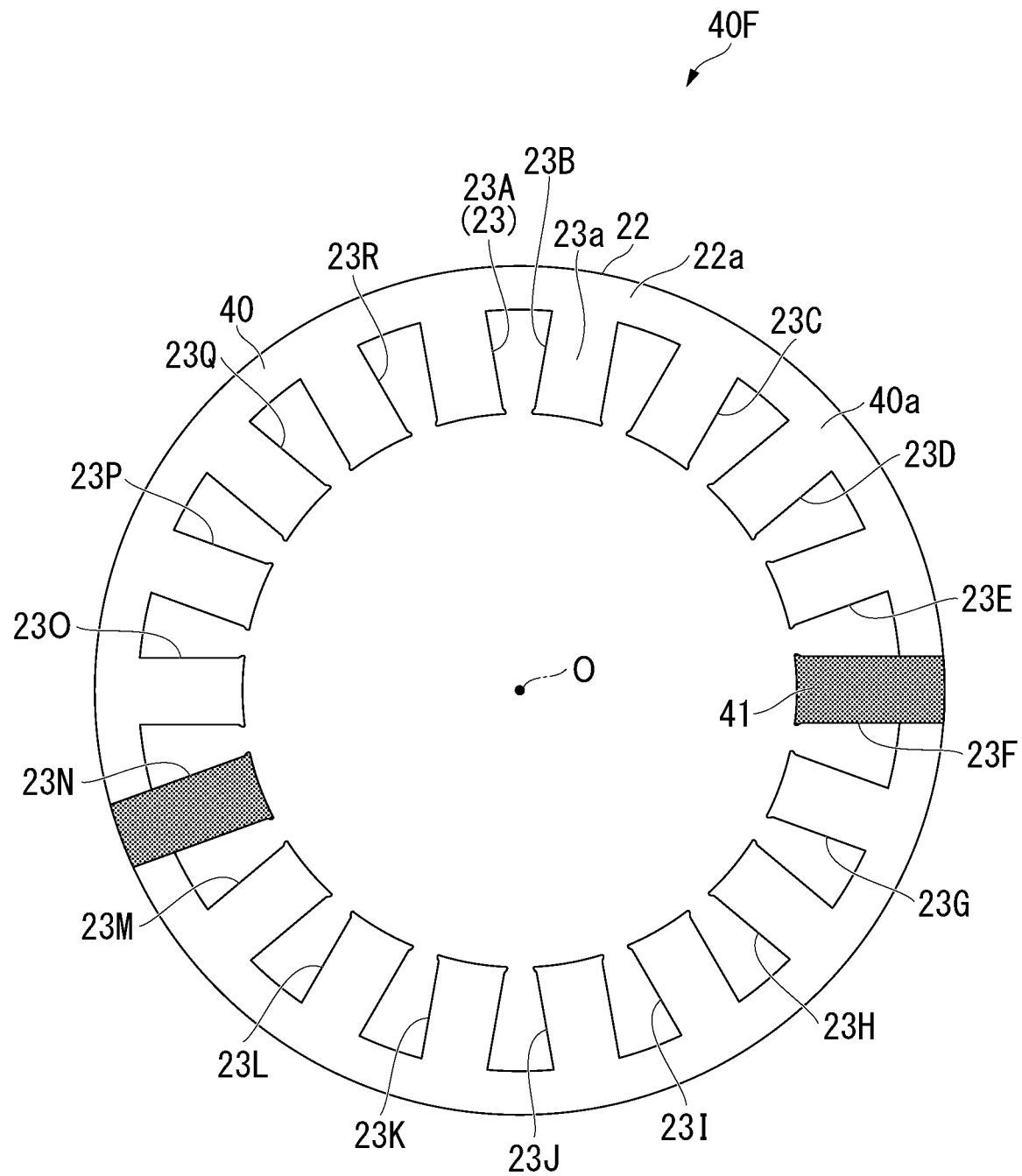
FIG. 17 is a plan view of the electrical steel sheet constituting the laminated core according to the embodiment of the present invention (in the case of N=7).

Further, as shown in FIG. 17 and Table 3, in the electrical steel sheet 40F, the adhesion part 41 is provided on the surface 23a of each of the tooth parts 23 of a sixteenth group which will be described later and the surface 22a of the radial outer portion of each of the tooth parts 23 of the sixteenth group in the core back part 22. The tooth parts 23 of the sixteenth group referred to here mean the tooth parts 23F and 23N.

Figure 18:
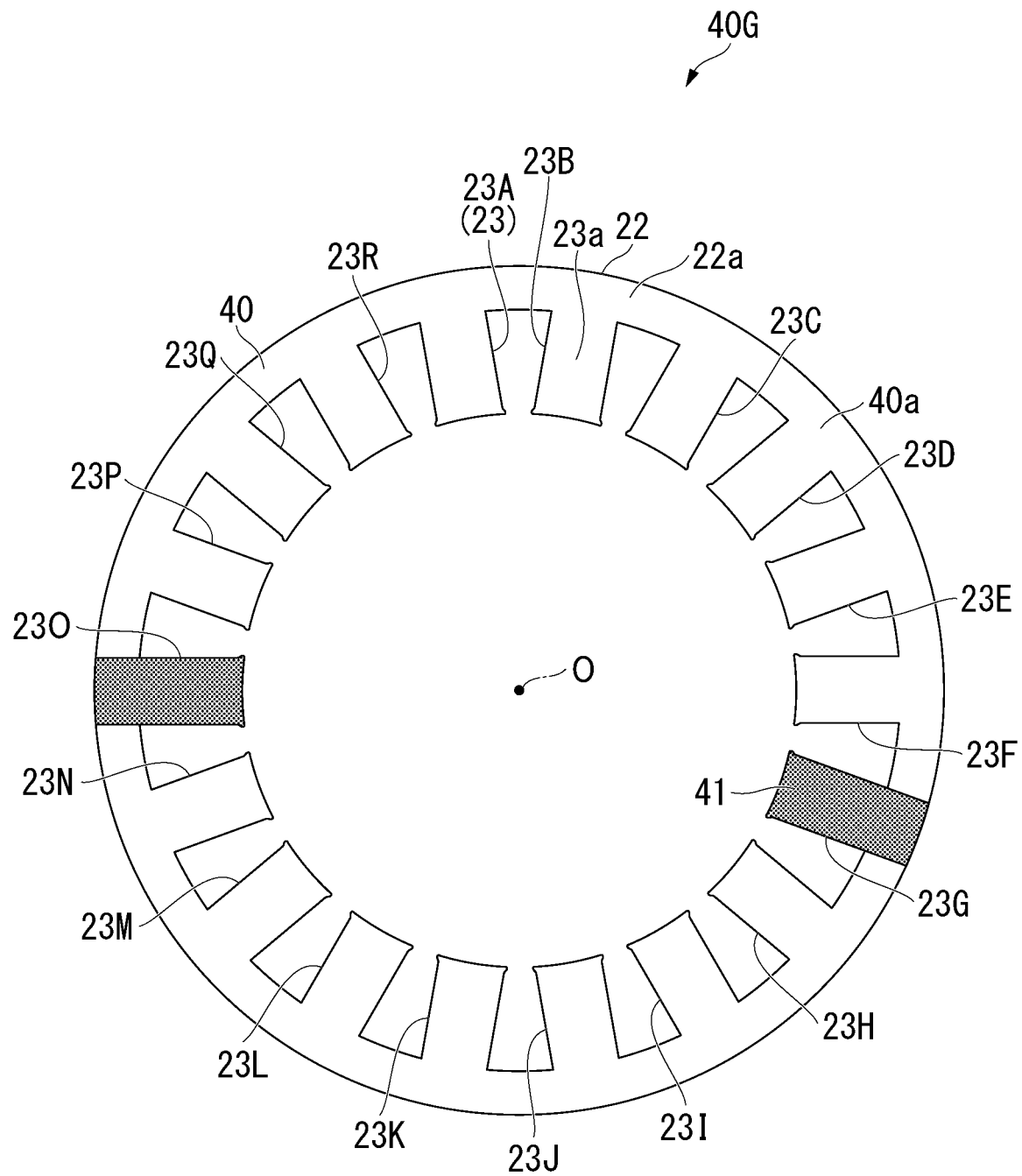
FIG. 18 is a plan view of the electrical steel sheet constituting the laminated core according to the embodiment of the present invention (in the case of N=7).

Further, as shown in FIG. 18 and Table 3, in the electrical steel sheet 40G, the adhesion part 41 is provided on the surface 23a of each of the tooth parts 23 of a seventeenth group which will be described later and the surface 22a of the radial outer portion of each of the tooth parts 23 of the seventeenth group in the core back part 22. The tooth parts 23 of the seventeenth group referred to here mean the tooth parts 23G and 23O.

Figure 19:
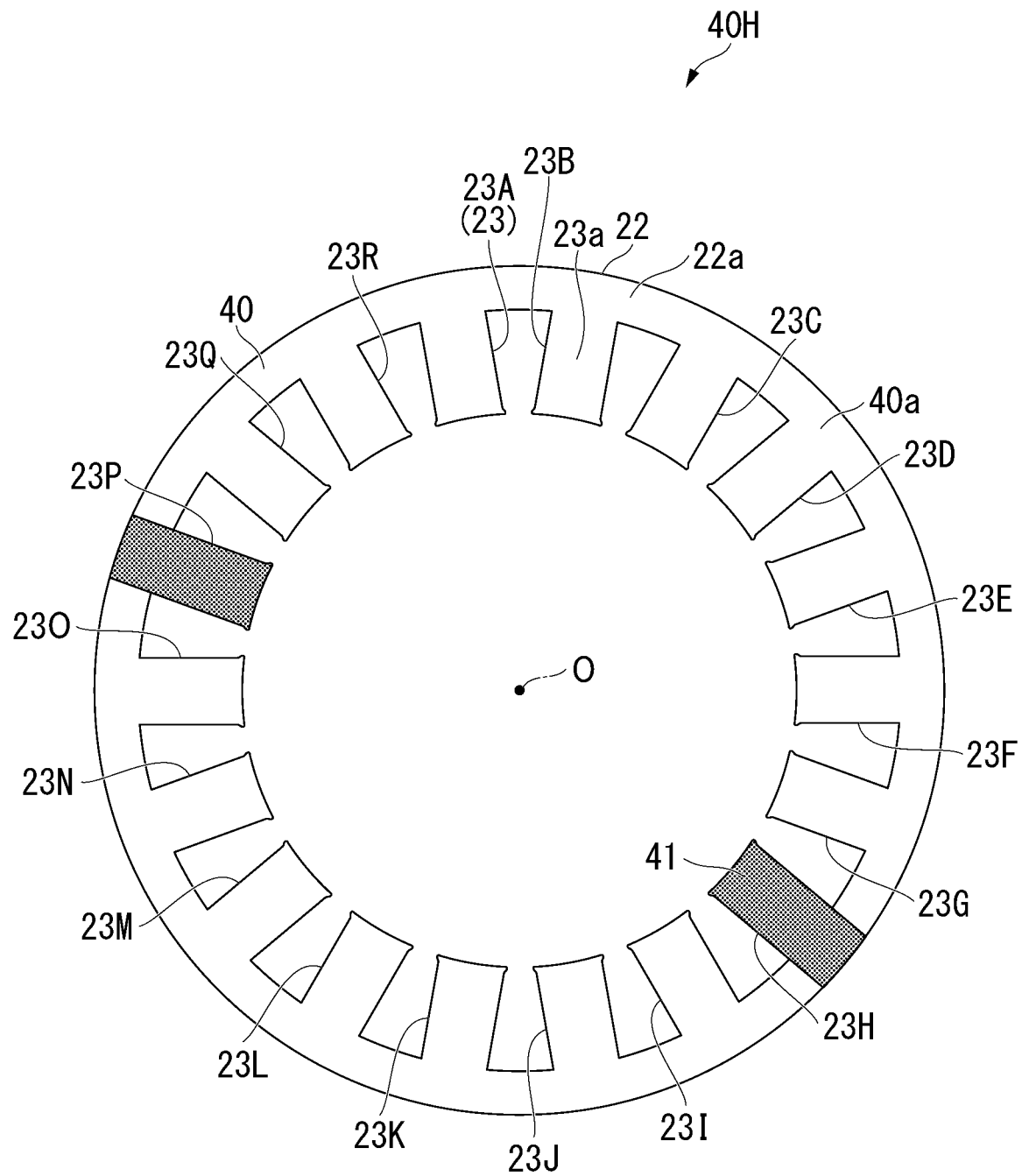
FIG. 19 is a plan view of the electrical steel sheet constituting the laminated core according to the embodiment of the present invention (in the case of N=7).

Further, as shown in FIG. 19 and Table 3, in the electrical steel sheet 40H, the adhesion part 41 is provided on the surface 23a of each of the tooth parts 23 of an eighteenth group which will be described later and the surface 22a of the radial outer portion of each of the tooth parts 23 of the eighteenth group in the core back part 22. The tooth parts 23 of the eighteenth group referred to here mean the tooth parts 23H and 23P.

Figure 20:
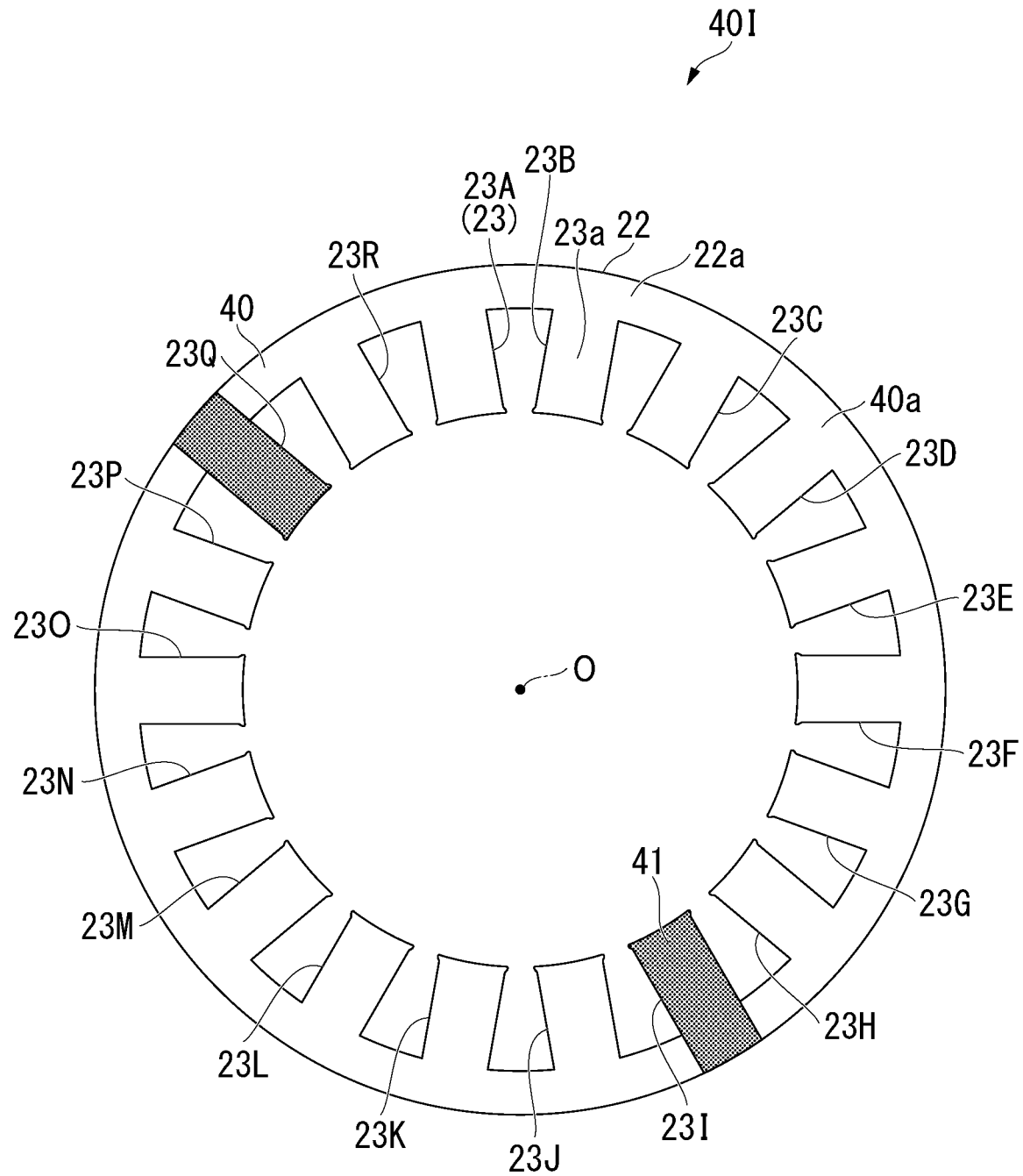
FIG. 20 is a plan view of the electrical steel sheet constituting the laminated core according to the embodiment of the present invention (in the case of N=7).

Further, as shown in FIG. 20 and Table 3, in the electrical steel sheet 40I, the adhesion part 41 is provided on the surface 23a of each of the tooth parts 23 of a nineteenth group which will be described later and the surface 22a of the radial outer portion of each of the tooth parts 23 of the nineteenth group in the core back part 22. The tooth parts 23 of the nineteenth group referred to here mean the tooth parts 23I and 23Q.

Figure 21:
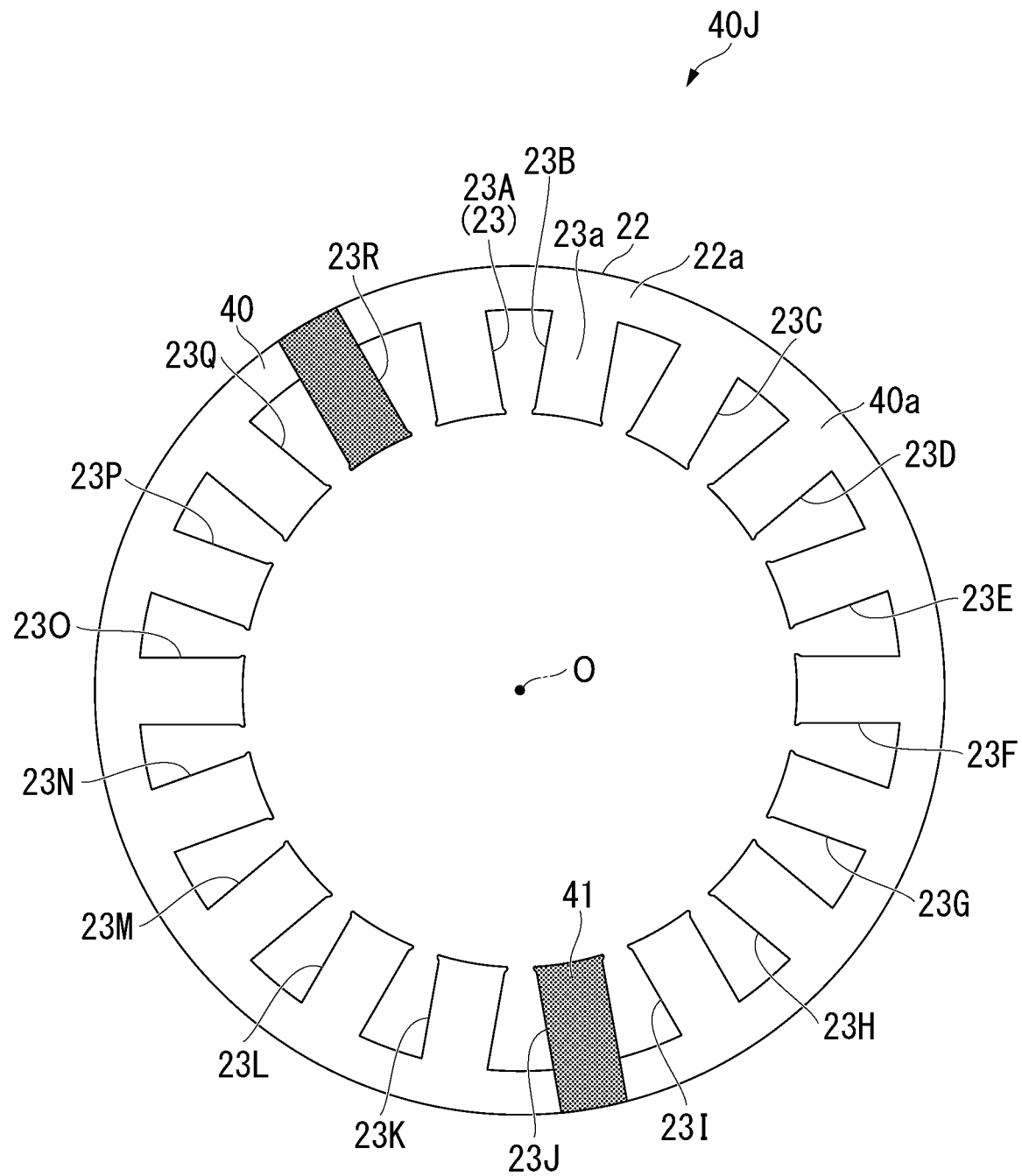
FIG. 21 is a plan view of the electrical steel sheet constituting the laminated core according to the embodiment of the present invention (in the case of N=7).

Further, as shown in FIG. 21 and Table 3, in the electrical steel sheet 40G, the adhesion part 41 is provided on the surface 23a of each of the tooth parts 23 of a twentieth group which will be described later and the surface 22a of the radial outer portion of each of the tooth parts 23 of the twentieth group in the core back part 22. The tooth parts 23 of the twentieth group referred to here mean the tooth parts 23J and 23R.

In this example, 10 types of layers formed by the adhesion parts 41 having different shapes in a plan view are provided in the stator core 21. The layers formed by the 10 types of adhesion parts 41 correspond from the tooth parts 23 of the eleventh group to the tooth parts 23 of the twentieth group. In all the layers formed by the 10 types of adhesion parts 41, the adhesion parts 41 are disposed on the tooth parts 23 and the like at intervals of one, seven, or nine tooth parts 23 in the circumferential direction.

A difference between the tooth parts 23 in which the adhesion parts 41 are provided between the layers by the 10 types of adhesion parts 41 is the same as in the case of N=1 and 2, and the description thereof will be omitted.

When 12 or more electrical steel sheets 40 are stacked in the stator core 21, the stator core 21 is configured as follows. That is, another electrical steel sheet 40A is stacked next to the electrical steel sheet 40J. Hereinafter, other electrical steel sheets 40B to 40J are stacked in this order at positions adjacent to the second side in the stacking direction with respect to the other electrical steel sheet 40A.

However, when the other electrical steel sheet 40A is stacked next to the electrical steel sheet 40J, the other electrical steel sheet 40A is disposed at a state in which it rotates around the central axis O with respect to the electrical steel sheet 40J so that the tooth part 23K of the other electrical steel sheet 40A overlaps the tooth part 23A of the electrical steel sheet 40J.

TABLE 3

| | 23A | 23B | 23C | 23D | 23E | 23F | 23G | 23H | 23I | 23J | 23K | 23L | 23M | 23N | 23O | 23P | 23Q | 23R |
|---|---|---|---|---|---|---|---|---|---|---|---|---|---|---|---|---|---|---|
| 40A | ○ | | | | | | | | | ○ | | | | | | | | |
| 40B | | ○ | | | | | | | | | ○ | | | | | | | |
| 40C | | | ○ | | | | | | | | | ○ | | | | | | |
| 40D | | | | ○ | | | | | | | | | ○ | | | | | |
| 40E | | | | | ○ | | | | | | | | | ○ | | | | |
| 40F | | | | | | ○ | | | | | | | | | ○ | | | |
| 40G | | | | | | | ○ | | | | | | | | | ○ | | |
| 40H | | | | | | | | ○ | | | | | | | | | ○ | |
| 40I | | | | | | | | | ○ | | | | | | | | | ○ |
| 40J | ○ | | | | | | | | | ○ | | | | | | | | |

Here, a modified example in the case of the stator core 21 in which N=7 will be described with reference to Table 4.

In the stator core 21 of this modified example, in addition to the configuration of the stator core 21 shown in the example of Table 3, the adhesion parts 41 are disposed at the following two locations. Specifically, the adhesion parts 41 are respectively disposed on the tooth part 23A and the like of the electrical steel sheet 40I and the tooth part 23B and the like of the electrical steel sheet 40J.

When 12 or more electrical steel sheets 40 are stacked in the stator core 21 of the modified example, they are basically stacked in the same manner as in the stator core 21 shown in the example of Table 3. However, when another electrical steel sheet 40A is stacked next to the electrical steel sheet 40J, the other electrical steel sheet 40A is disposed in a state in which it rotates around the central axis O with respect to the electrical steel sheet 40J so that the tooth part 23G of the other electrical steel sheet 40A overlaps the tooth part 23A of the electrical steel sheet 40J.

included in the stator core 21 is larger (for example, when 21 electrical steel sheets 40 are provided), the stator core 21 may have the first configuration. In this case, the electrical steel sheets 40 after the twelfth electrical steel sheet 40 are stacked as described above.

In order to examine the first configuration and the second configuration in detail, a first interval and a second interval are newly defined. The first interval is an interval set for each of the tooth parts 23A to 23R of the electrical steel sheet 40. The second interval is an interval set for each of the layers by each of the adhesion parts 41.

The first interval is an interval indicating by how many layers the adhesion parts 41 in which the arrangement regions thereof overlap each other when seen in the stacking direction are separated from each other in a target tooth parts 23. For example, in Table 1, attention is paid to the tooth part 23A. In the tooth part 23A, the adhesion parts 41 in which the arrangement regions thereof overlap each other when seen in the stacking direction are disposed at a one-layer

TABLE 4

| | 23A | 23B | 23C | 23D | 23E | 23F | 23G | 23H | 23I | 23J | 23K | 23L | 23M | 23N | 23O | 23P | 23Q | 23R |
|---|---|---|---|---|---|---|---|---|---|---|---|---|---|---|---|---|---|---|
| 40A | ○ | | | | | | | | | ○ | | | | | | | | |
| 40B | | ○ | | | | | | | | | ○ | | | | | | | |
| 40C | | | ○ | | | | | | | | | ○ | | | | | | |
| 40D | | | | ○ | | | | | | | | | ○ | | | | | |
| 40E | | | | | ○ | | | | | | | | | ○ | | | | |
| 40F | | | | | | ○ | | | | | | | | | ○ | | | |
| 40G | | | | | | | ○ | | | | | | | | | ○ | | |
| 40H | | | | | | | | ○ | | | | | | | | | ○ | |
| 40I | ○ | | | | | | | | ○ | | | | | | | | | ○ |
| 40J | | ○ | | | | | | | | ○ | | | | | | | | ○ |

Here, it can be said that the stator core 21 shown in the above-described examples of Tables 1 and 2 has the following first and second configurations relating to the adhesion part 41.

First configuration: a configuration in which the adhesion parts 41 are disposed at equal intervals in the stacking direction (at intervals of the equal number of layers in the stacking direction) over the entire length of the stator core 21 in the stacking direction in one of the plurality of tooth parts 23 arranged in the circumferential direction.

Second configuration: a configuration in which the adhesion parts 41 are disposed at equal intervals in the circumferential direction (at intervals of the equal number of tooth parts 23 in the circumferential direction) over the entire circumference of the stator core 21 in one of the layers formed by the plurality of adhesion parts 41 arranged in the stacking direction.

For example, in the stator core 21 shown in the example of Table 3, when the number of electrical steel sheets 40 interval over the entire length of the stator core 21 in the stacking direction. Thus, in the tooth part 23A, the first interval is 1 over the entire length of the stator core 21 in the stacking direction.

The second interval is an interval indicating how many tooth parts 23 on which the adhesion part 41 is not disposed are disposed between the circumferential directions of the other adhesion parts 41 adjacent to each other in the circumferential direction in the layer formed by one target adhesion part 41. For example, in Table 1, attention is paid to the layer formed by the adhesion part 41 corresponding to the electrical steel sheet 40A. In the layer formed by the adhesion part 41 corresponding to the electrical steel sheet 40A, one tooth part 23 is disposed between the circumferential directions of the other adhesion parts 41 adjacent to each other in the circumferential direction over the entire circumference of the stator core 21. Thus, in the layer formed by the adhesion part 41 corresponding to the electrical steel sheet 40A, the second interval is 1 over the entire circumference of the stator core 21.

The first configuration and the second configuration can be expressed using the first interval and the second interval as follows.

First configuration: a configuration in which the first intervals are equal to each other over the entire length of the stator core 21 in the stacking direction in one of the plurality of tooth parts 23 arranged in the circumferential direction.

Second configuration: a configuration in which the second intervals are equal to each other over the entire circumference of the stator core 21 in one of the layers formed by the plurality of adhesion parts 41 arranged in the stacking direction.

In the stator core 21 of the example shown in Table 1, in all the tooth parts 23, the first interval is 1 over the entire length of the stator core 21 in the stacking direction. In all the layers formed by the adhesion parts 41, the second interval is 1 over the entire circumference of the stator core 21. The stator core 21 includes the first configuration and the second configuration.

In the stator core 21 of the example shown in Table 2, in all the tooth parts 23, the first interval is 2 over the entire length of the stator core 21 in the stacking direction. In all the layers formed by the adhesion parts 41, the second interval is 2 over the entire circumference of the stator core 21. The stator core 21 includes the first configuration and the second configuration.

In the stator core 21 of the example shown in Table 3, the first interval is 7 in the tooth parts 23I, 23J, 23Q, and 23R. The tooth parts 23 do not have the first configuration because there is only one first interval. The first interval for the tooth parts 23A to 23H and 23K to 23P is not specified because there is no other adhesion parts 41 in which the arrangement regions thereof overlap each other when seen in the stacking direction. Since the first interval is not defined for these tooth parts 23, the first configuration is not provided.

The second intervals in the layers by the adhesion parts 41 corresponding to the electrical steel sheets 40A and 40B are 7, 7, and 1. The second intervals in the layers by the adhesion parts 41 corresponding to the electrical steel sheets 40C to 40J are 7 and 9. In the stator core 21 of this example, all the layers formed by the plurality of adhesion parts 41 do not have the second configuration.

As described above, in the stator core 21 shown in the example of Table 3, when the number of electrical steel sheets 40 included in the stator core 21 is larger, the stator core 21 may have the first configuration.

Similar to the stator core 21 of the example shown in Table 3, the stator core 21 of the example shown in Table 4 does not have the first configuration and the second configuration.

However, the stator core 21 may not have the first configuration and the second configuration as in the example of stator cores 21 shown in Tables 3 and 4. The stator core 21 may not have one of the first configuration and the second configuration and may not have both of them.

In the following, the stator core 21 which does not have the first configuration and the second configuration will be described with reference to Tables 5 and 6.

In the stator core 21 of the examples shown in Tables 5 and 6, 11 electrical steel sheets 40 (400 and 40A to 40J) are stacked. The electrical steel sheet 400 is not shown in the tables.

In Tables 5 and 6, a portion marked with ○ indicates the tooth part 23B and the like on which the adhesion part 41 is disposed.

Instead of the stator core 21 having the first configuration, for example, the following third configuration or fifth configuration may be provided.

Third configuration: a configuration in which the arrangement regions of the adhesion parts 41 overlap each other at an interval of different prime number layers in a plan view seen in the stacking direction in a part of the region of the stator core 21 in the stacking direction in one of the plurality of tooth parts 23 arranged in the circumferential direction.

In other words, the third configuration is a configuration in which the first intervals adjacent to each other in the stacking direction are prime numbers different from each other in a part of the region of the stator core 21 in the stacking direction in one of the plurality of tooth parts 23 arranged in the circumferential direction.

Fifth configuration: a configuration in which the arrangement regions of the adhesion parts 41 overlap each other at an interval of different prime number layers over the entire length of the stator core 21 in the stacking direction, in a plan view in the stacking direction, in one of the plurality of tooth parts 23 arranged in the circumferential direction.

In other words, the fifth configuration is a configuration in which the first intervals adjacent to each other in the stacking direction are prime numbers different from each other over the entire length of the stator core 21 in the stacking direction in one of the plurality of tooth parts 23 arranged in the circumferential direction.

Further, instead of the stator core 21 having the second configuration, for example, the following fourth configuration or sixth configuration may be provided.

Fourth configuration: a configuration in which the number of tooth parts 23 between the adhesion parts 41 adjacent to each other in the circumferential direction is a prime number different from each other in a part of the region of the stator core 21 in the circumferential direction in one of the layers formed by the plurality of adhesion parts 41 arranged in the stacking direction.

In other words, the fourth configuration is a configuration in which the second intervals adjacent to each other in the circumferential direction are prime numbers different from each other in a part of the region of the stator core 21 in the circumferential direction in one of the layers formed by the plurality of adhesion parts 41 arranged in the stacking direction.

Sixth configuration: a configuration in which the number of tooth parts 23 between the adhesion parts 41 adjacent to each other in the circumferential direction is a prime number different from each other over the entire circumference of the stator core 21 in one of the layers formed by the plurality of adhesion parts 41 arranged in the stacking direction.

In other words, the sixth configuration is a configuration in which the second intervals adjacent to each other in the circumferential direction are prime numbers different from each other over the entire circumference of the stator core 21 in one of the layers formed by the plurality of adhesion parts 41 arranged in the stacking direction. In the following, the stator core 21 for each of cases will be described while attention is paid to the above configuration.

(Case 1)

The stator core 21 shown in an example of Table 5 will be described.

In the stator core 21 of Case 1, four adhesion parts 41 are disposed in the layer formed by the adhesion parts 41 corresponding to the electrical steel sheet 40A. In this layer, the four adhesion parts 41 are disposed on the tooth parts 23A, 23E, 23K, and 23O. Then, in each of the layers formed by the adhesion parts 41 corresponding to the electrical steel sheets 40B to 40D, each of the tooth parts 23 on which the adhesion part 41 is disposed is shifted to the first side in the circumferential direction by one tooth part with respect to the layers adjacent to the first side in the stacking direction.

In each of the layers formed by the adhesion parts 41 corresponding to the electrical steel sheets 40E and 40F, each of the tooth parts 23 on which the adhesion part 41 is disposed is shifted to the first side in the circumferential direction by one tooth part with respect to the layers adjacent to the first side in the stacking direction. Further, in each of the layers of the adhesion parts 41 corresponding to the electrical steel sheets 40E and 40F, the number of the adhesion parts 41 disposed is reduced to three. Specifically, in the layer formed by the adhesion part 41 corresponding to the electrical steel sheet 40E, when the adhesion part 41 tries to shift from the tooth part 23R to the first side in the circumferential direction, the adhesion part 41 is not shifted to the tooth part 23A but disappears.

In each of the layers formed by the adhesion parts 41 corresponding to the electrical steel sheets 40G and 40H, each of the tooth parts 23 on which the adhesion part 41 is disposed is shifted to the first side in the circumferential direction by one tooth part with respect to the layers adjacent to the first side in the stacking direction. Further, in each of the layers of the adhesion parts 41 corresponding to the electrical steel sheets 40G and 40H, the number of the adhesion parts 41 is increased to four. Specifically, in the layer formed by the adhesion part 41 corresponding to the electrical steel sheet 40G, the adhesion part 41 is disposed on the tooth part 23A.

In each of the layers formed by the adhesion parts 41 corresponding to the electrical steel sheets 40I and 40J, each of the tooth parts 23 on which the adhesion part 41 is disposed is shifted to the first side in the circumferential direction by one tooth part with respect to the layers adjacent to the first side in the stacking direction. Further, in each of the layers of the adhesion parts 41 corresponding to the electrical steel sheets 40I and 40J, the number of the adhesion parts 41 disposed is reduced to three again. Specifically, in the layer formed by the adhesion part 41 corresponding to the electrical steel sheet 40I, when the adhesion part 41 tries to shift from the tooth part 23R to the first side in the circumferential direction, the adhesion part 41 is not shifted to the tooth part 23A but disappears.

second intervals are arranged in the order of 3, 5, 3, and 3 toward the first side in the circumferential direction. These layers have the fourth configuration.

Further, in the layers having the three adhesion parts 41, for example, the layer corresponding to the electrical steel sheet 40E among the layers formed by the adhesion parts 41, the second intervals are arranged in the order of 3, 5, and 7 toward the first side in the circumferential direction. These layers have the sixth configuration.

The stator core 21 of Case 1 does not have the third configuration and the fifth configuration.

(Case 2)

Next, the stator core of an example shown in Table 6 will be described.

In the stator core 21 of Case 2, six adhesion parts 41 are disposed in the layer formed by the adhesion parts 41 corresponding to the electrical steel sheet 40A. In this layer, a total of six adhesion parts 41 are disposed on the tooth parts 23A, 23D, 23G, 23J, 23M, and 23P. Then, in the layers formed by the adhesion parts 41 corresponding to the electrical steel sheets 40B and 40C, each of the tooth parts 23 on which the adhesion part 41 is disposed is shifted to the first side in the circumferential direction by one tooth part with respect to the layers adjacent to the first side in the stacking direction.

In each of the layers by the adhesion parts 41 corresponding to the electrical steel sheets 40D to 40I, each of the tooth parts 23 on which the adhesion part 41 is disposed is shifted to the first side in the circumferential direction by one tooth part with respect to the layers adjacent to the first side in the stacking direction. Further, in each of the layers of the adhesion parts 41 corresponding to the electrical steel sheets 40D to 40I, the number of the adhesion parts 41 disposed is reduced to three. Specifically, in the layer formed by the adhesion part 41 corresponding to the electrical steel sheet 40D, when the adhesion part 41 tries to shift from the tooth parts 23F, 23L, and 23R to the first side in the circumferential direction, the adhesion part 41 is not shifted to the tooth parts 23G, 23M, and 23A but disappears.

In each of the layers by the adhesion parts 41 corresponding to the electrical steel sheet 40J, the tooth part 23 on which the adhesion part 41 is disposed is shifted to the first side in the circumferential direction by one tooth part with

TABLE 5

|     | 23A | 23B | 23C | 23D | 23E | 23F | 23G | 23H | 23I | 23J | 23K | 23L | 23M | 23N | 23O | 23P | 23Q | 23R |
|-----|-----|-----|-----|-----|-----|-----|-----|-----|-----|-----|-----|-----|-----|-----|-----|-----|-----|-----|
| 40A | o   |     |     |     | o   |     |     |     |     |     | o   |     |     |     | o   |     |     |     |
| 40B |     | o   |     |     |     | o   |     |     |     |     |     | o   |     |     |     | o   |     |     |
| 40C |     |     | o   |     |     |     | o   |     |     |     |     |     | o   |     |     |     | o   |     |
| 40D |     |     |     | o   |     |     |     | o   |     |     |     |     |     | o   |     |     |     | o   |
| 40E |     |     |     |     | o   |     |     |     | o   |     |     |     |     |     | o   |     |     |     |
| 40F |     |     |     |     |     | o   |     |     |     | o   |     |     |     |     |     | o   |     |     |
| 40G | o   |     |     |     |     |     | o   |     |     |     | o   |     |     |     |     |     | o   |     |
| 40H |     | o   |     |     |     |     |     | o   |     |     |     | o   |     |     |     |     |     | o   |
| 40I |     |     | o   |     |     |     |     |     | o   |     |     |     | o   |     |     |     |     |     |
| 40J |     |     |     | o   |     |     |     |     |     | o   |     |     |     | o   |     |     |     |     |

In such a stator core 21, it can be said that some of the layers formed by the plurality of adhesion parts 41 have the fourth configuration and the remaining layers have the sixth configuration.

That is, in the layers having the four adhesion parts 41, for example, the layer corresponding to the electrical steel sheet 40A among the layers formed by the adhesion parts 41, the respect to the layers adjacent to the first side in the stacking direction. Further, the number of the adhesion parts 41 is increased to 6 in each of the layers formed by the adhesion parts 41 corresponding to the electrical steel sheet 40J. Specifically, in the layer formed by the adhesion parts 41 corresponding to the electrical steel sheet 40J, the adhesion parts 41 are disposed on the tooth parts 23A, 23G, and 23M.

TABLE 6

| | 23A | 23B | 23C | 23D | 23E | 23F | 23G | 23H | 23I | 23J | 23K | 23L | 23M | 23N | 23O | 23P | 23Q | 23R |
|---|---|---|---|---|---|---|---|---|---|---|---|---|---|---|---|---|---|---|
| 40A | ○ | | | ○ | | | ○ | | | ○ | | | ○ | | | ○ | | |
| 40B | | ○ | | | ○ | | | ○ | | | ○ | | | ○ | | | ○ | |
| 40C | | | ○ | | | ○ | | | ○ | | | ○ | | | ○ | | | ○ |
| 40D | | | | ○ | | | | | | ○ | | | | | | ○ | | |
| 40E | | | | | ○ | | | | | | ○ | | | | | | ○ | |
| 40F | | | | | | ○ | | | | | | ○ | | | | | | ○ |
| 40G | ○ | | | | | | ○ | | | | | | ○ | | | | | |
| 40H | | ○ | | | | | | ○ | | | | | | ○ | | | | |
| 40I | | | ○ | | | | | | ○ | | | | | | ○ | | | |
| 40J | ○ | | | ○ | | | ○ | | | ○ | | | ○ | | | ○ | | |

It can be said that such a stator core 21 has the fifth configuration in some of the tooth parts 23 among the plurality of tooth parts 23 arranged in the circumferential direction.

That is, the tooth parts 23A, 23D, 23G, 23J, 23M, and 23P in which the three arrangement regions thereof overlap each other in a plan view seen in the stacking direction will be described. For example, in the tooth part 23A, the first intervals adjacent to each other in the stacking direction are disposed in the order of 5 and 2 from the first side to the second side in the stacking direction over the entire length of the stator core 21 in the stacking direction. For example, in the tooth part 23D, the first intervals adjacent to each other in the stacking direction are disposed in the order of 2 and 5 from the first side to the second side in the stacking direction over the entire length of the stator core 21 in the stacking direction.

The tooth parts 23A, 23D, 23G, 23J, 23M, and 23P have the fifth configuration.

The stator core 21 of Case 2 does not have the third configuration, the fourth configuration, and the sixth configuration.

In the tooth part 23A, the first intervals are 5 and 2 from the first side to the second side in the stacking direction. However, for example, in the tooth part 23A, the first intervals may be 5, 2, 5, 2, . . . from the first side to the second side in the stacking direction. Then, in the tooth part 23B, the first intervals may be 5, 2, 2, 5, . . . from the first side to the second side in the stacking direction. In this way, the first interval may be changed for each of the tooth parts 23.

(Case 3)

Next, the stator core of an example shown in Table 7 will be described.

In the stator core 21 of the example shown in Table 7, 16 electrical steel sheets 40 (40O and 40A to 40O) are stacked. The electrical steel sheet 40O is not shown in the table.

In the stator core 21 of Case 3, four adhesion parts 41 are disposed in the layer formed by the adhesion parts 41 corresponding to the electrical steel sheet 40A. In this layer, the four adhesion parts 41 are disposed on the tooth parts 23A, 23D, 23J, and 23M. Then, in each of the layers formed by the adhesion parts 41 corresponding to the electrical steel sheets 40B to 40O, the tooth part 23 on which the adhesion part 41 is disposed is shifted to the first side in the circumferential direction by one tooth part with respect to the layers adjacent to the first side in the stacking direction.

TABLE 7

| | 23A | 23B | 23C | 23D | 23E | 23F | 23G | 23H | 23I | 23J | 23K | 23L | 23M | 23N | 23O | 23P | 23Q | 23R |
|---|---|---|---|---|---|---|---|---|---|---|---|---|---|---|---|---|---|---|
| 40A | ○ | | | ○ | | | | | | ○ | | | ○ | | | | | |
| 40B | | ○ | | | ○ | | | | | | ○ | | | ○ | | | | |
| 40C | | | ○ | | | ○ | | | | | | ○ | | | ○ | | | |
| 40D | | | | ○ | | | ○ | | | | | | ○ | | | ○ | | |
| 40E | | | | | ○ | | | ○ | | | | | | ○ | | | ○ | |
| 40F | | | | | | ○ | | | ○ | | | | | | ○ | | | ○ |
| 40G | ○ | | | | | | ○ | | | ○ | | | | | | ○ | | |
| 40H | | ○ | | | | | | ○ | | | ○ | | | | | | ○ | |
| 40I | | | ○ | | | | | | ○ | | | ○ | | | | | | ○ |
| 40J | ○ | | | ○ | | | | | | ○ | | | ○ | | | | | |
| 40K | | ○ | | | ○ | | | | | | ○ | | | ○ | | | | |
| 40L | | | ○ | | | ○ | | | | | | ○ | | | ○ | | | |
| 40M | | | | ○ | | | ○ | | | | | | ○ | | | ○ | | |
| 40N | | | | | ○ | | | ○ | | | | | | ○ | | | ○ | |
| 40O | | | | | | ○ | | | ○ | | | | | | ○ | | | ○ |

It can be said that such a stator core 21 has the fifth configuration in all the tooth parts 23 arranged in the circumferential direction.

That is, the tooth parts 23A to 23C and 23J to 23L in which the three arrangement regions thereof overlap each other in a plan view seen in the stacking direction will be described. In the tooth parts 23, the first intervals adjacent to each other in the stacking direction are arranged in the order of 5 and 2 from the first side to the second side in the stacking direction over the entire length of the stator core 21 in the stacking direction. Next, the tooth parts 23G to 23I and 23P to 23R in which the three arrangement regions thereof overlap each other in a plan view seen in the stacking direction will be described. In the tooth parts 23, the first intervals adjacent to each other in the stacking direction are arranged in the order of 2, 5 from the first side to the second side in the stacking direction over the entire length of the stator core 21 in the stacking direction. Next, the tooth parts 23D to 23F and 23M to 23O in which the four arrangement regions thereof overlap each other in a plan view seen in the stacking direction will be described. In the tooth parts 23, the first intervals adjacent to each other in the stacking direction are arranged in the order of 2, 5 and 2 from the first side to the second side in the stacking direction over the entire length of the stator core 21 in the stacking direction.

Further, it can be said that such a stator core 21 has the sixth configuration in all layers of the layer formed by the plurality of adhesion parts 41.

That is, in all the layers formed by the adhesion parts 41, the second intervals are arranged in the order of 2, 5, 2, and 5 toward the first side in the circumferential direction.

The stator core 21 of Case 3 does not have the third configuration and the fourth configuration.

Here, a configuration of the stator core 21 in which the adhesion part 41 is disposed to have at least one of the third configuration and the fourth configuration is hereinafter referred to as a first unequal interval configuration. A configuration of the stator core 21 in which the adhesion part 41 is disposed to have one of the fifth configuration and the sixth configuration is hereinafter referred to as a second unequal interval configuration. A configuration of the stator core 21 in which the adhesion part 41 is disposed to have both the fifth configuration and the sixth configuration is hereinafter referred to as a third unequal interval configuration.

The stator core 21 having the first unequal interval configuration, the second unequal interval configuration, or the third unequal interval configuration can further prevent resonance frequencies of the electric motor and the laminated core from matching.

In the stator core 21 of Case 1, since some of the layers formed by the plurality of adhesion parts 41 have the fourth configuration, the stator core 21 of this example has the fourth configuration. Since the remaining layers of the layers formed by the plurality of adhesion parts 41 have the sixth configuration, the stator core of this example has the sixth configuration. The stator core 21 of Case 1 does not have the third configuration and the fifth configuration.

Therefore, the stator core 21 of Case 1 has the first unequal interval configuration because it has the fourth configuration of the third configuration and the fourth configuration.

The stator core 21 of Case 1 has only the sixth configuration of the fifth configuration and the sixth configuration. Therefore, the stator core 21 of this example has the second unequal interval configuration, but does not have the third unequal interval configuration.

The stator core 21 of the case 2 has the fifth configuration. The stator core 21 of Case 2 does not have the third configuration, the fourth configuration, and the sixth configuration.

Therefore, the stator core 21 of this example does not have the first unequal interval configuration because it does not have both the third configuration and the fourth configuration.

The stator core 21 of this example has only the fifth configuration of the fifth configuration and the sixth configuration. Therefore, the stator core 21 of this example has the second unequal interval configuration, but does not have the third unequal interval configuration.

The stator core 21 of Case 3 does not have the third configuration and the fourth configuration, but has the fifth configuration and the sixth configuration.

Therefore, the stator core 21 of this example does not have the first unequal interval configuration and the second unequal interval configuration, but has the third unequal interval configuration.

In the first unequal interval configuration to the third unequal interval configuration, the effect of preventing the resonance frequencies of the electric motor and the laminated core (the stator core) from matching is greater in the second unequal interval configuration than in the first unequal interval configuration. This is because, in the second unequal interval configuration, the arrangement regions of the adhesion parts 41 overlap each other at an interval of different prime number layers over the entire length in the stacking direction, or the number of adhesion parts 41 is a prime number in which the numbers of tooth parts 23 between adhesion parts 41 adjacent to each other in the circumferential direction over the entire circumference are different from each other. Therefore, this is because the second unequal interval configuration improves the non-uniformity of the adhesion part of the laminated core as compared with the first unequal interval configuration.

This effect is greater in the third unequal interval configuration than in the second unequal interval configuration. This is because, in the third unequal interval configuration, the arrangement regions of the adhesion parts 41 overlap each other at an interval of different prime number layers over the entire length in the stacking direction, and also the adhesion parts 41 are a prime number in which the number of tooth parts 23 between the adhesion parts 41 adjacent to each other in the circumferential direction over the entire circumference is different from each other. Therefore, this is because the third unequal interval configuration further improves the non-uniformity of the adhesion part of the laminated core as compared with the second unequal interval configuration.

For the adhesion part 41, for example, a thermosetting adhesive by polymer bonding or the like is used. As a composition of the adhesive, (1) an acrylic-based resin, (2) an epoxy-based resin, (3) a composition containing an acrylic-based resin and an epoxy-based resin, and the like can be applied.

As the adhesive, a radical polymerization type adhesive or the like can also be used in addition to the thermosetting adhesive. From the viewpoint of productivity, a room temperature curing type (room temperature adhesive type) adhesive is desirable. The room temperature curing type adhesive cures at 20° C. to 30° C. In addition, in this specification, a numerical range represented by using "to" means a range including numerical values before and after "to" as the lower limit value and the upper limit value.

As the room temperature curing type adhesive, an acrylic-based adhesive is preferable. Typical acrylic-based adhesives include a second generation acrylic-based adhesive (SGA) and the like. An anaerobic adhesive, an instant adhesive, and an elastomer-containing acrylic-based adhesive can be used as long as the effects of the present invention are not impaired.

The adhesive referred to here refers to a state before curing. The adhesive becomes the adhesion part 41 when the adhesive is cured.

An average tensile modulus of elasticity E of the adhesion part 41 at room temperature (20° C. to 30° C.) is in a range of 1500 MPa to 4500 MPa. When the average tensile modulus of elasticity E of the adhesion part 41 is less than 1500 MPa, there is a problem that a rigidity of the laminated core is lowered. Therefore, a lower limit value of the average tensile modulus of elasticity E of the adhesion part 41 is 1500 MPa, and more preferably 1800 MPa. On the contrary, when the average tensile modulus of elasticity E of the adhesion part 41 exceeds 4500 MPa, there is a problem that the insulation coating formed on the surface of the electrical steel sheet 40 is peeled off. Therefore, an upper limit value of the average tensile modulus of elasticity E of the adhesion part 41 is 4500 MPa, and more preferably 3650 MPa.

The average tensile modulus of elasticity E is measured by a resonance method. Specifically, the tensile modulus of elasticity is measured based on JIS R 1602:1995.

More specifically, first, a sample for measurement (not shown) is produced. This sample is obtained by adhering two electrical steel sheets 40 with an adhesive to be measured and curing the adhesive to form the adhesion part 41. When the adhesive is a thermosetting type, the curing is performed by heating and pressurizing under heating and pressurizing conditions in an actual operation. On the other hand, when the adhesive is a room temperature curing type, it is performed by pressurizing at room temperature.

Then, the tensile modulus of elasticity of this sample is measured by the resonance method. As described above, a method for measuring the tensile modulus of elasticity by the resonance method is performed based on JIS R 1602: 1995. After that, the tensile modulus of elasticity of the adhesion part 41 alone can be obtained by removing an influence of the electrical steel sheet 40 itself from the tensile modulus of elasticity (a measured value) of the sample by calculation.

The tensile modulus of elasticity obtained from the sample in this way is equal to an average value of all the stator cores 21 which are the laminated cores. Thus, this value is regarded as the average tensile modulus of elasticity E. The composition is set so that the average tensile modulus of elasticity E hardly changes at a stacking position in the stacking direction or at a circumferential position around the central axis of the stator core 21. Therefore, the average tensile modulus of elasticity E can be set to a value obtained by measuring the cured adhesion part 41 at an upper end position of the stator core 21.

As the adhering method using the thermosetting adhesive, for example, a method in which an adhesive is applied to the electrical steel sheet 40 and then adhered by one of heating and press-stacking, or both of them can be adopted. A heating unit may be, for example, one of heating in a high temperature bath or an electric furnace, a method of directly energizing, and the like, and may be any one.

In order to obtain stable and sufficient adhesion strength, the thickness of the adhesion part 41 is preferably 1 μm or more.

On the other hand, when the thickness of the adhesion part 41 exceeds 100 μm, an adhesion force is saturated. Further, as the adhesion part 41 becomes thicker, the space factor decreases, and the magnetic properties such as iron loss of the laminated core decrease. Therefore, the thickness of the adhesion part 41 is 1 μm or more and 100 μm or less. The thickness of the adhesion part 41 is more preferably 1 μm or more and 10 μm or less.

In the above description, the thickness of the adhesion part 41 means an average thickness of the adhesion part 41.

The average thickness of the adhesion part 41 is more preferably 1.0 μm or more and 3.0 μm or less. When the average thickness of the adhesion part 41 is less than 1.0 sufficient adhesion force cannot be ensured as described above. Therefore, a lower limit value of the average thickness of the adhesion part 41 is 1.0 μm, and more preferably 1.2 μm. On the contrary, when the average thickness of the adhesion part 41 becomes thicker than 3.0 μm, problems such as a large increase in a strain amount of the electrical steel sheet 40 due to a shrinkage during thermosetting occur. Therefore, an upper limit value of the average thickness of the adhesion part 41 is 3.0 μm, and more preferably 2.6 μm.

The average thickness of the adhesion part 41 is an average value of all the laminated cores. An average thickness of the adhesion part 41 hardly changes at the stacking position in the stacking direction and a circumferential position around the central axis of the stator core 21. Therefore, the average thickness of the adhesion part 41 can be set as an average value of numerical values measured at 10 or more points in the circumferential direction at an upper end position of the stator core 21.

The average thickness of the adhesion part 41 can be adjusted, for example, by changing an amount of adhesive applied. Further, in the case of the thermosetting adhesive, the average tensile modulus of elasticity E of the adhesion part 41 may be adjusted, for example, by changing one or both of heating and pressurizing conditions applied at the time of adhesion and a type of curing agent.

In the present embodiment, the plurality of electrical steel sheets 40 forming the rotor core 31 are fixed to each other by a fastening 42 (a dowel) (see FIG. 1). However, the plurality of electrical steel sheets 40 forming the rotor core 31 may be stacked to each other by the adhesion part 41.

The laminated cores such as the stator core 21 and the rotor core 31 may be formed by so-called turn-stacking.

The electric motor 10 can rotate at a rotation speed of 1000 rpm by applying an excitation current having an effective value of 10 A and a frequency of 100 Hz to each of the phases, for example.

As described above, in the stator core 21 (the laminated core) according to the present embodiment, the adhesion part 41 which adheres the electrical steel sheets 40 is disposed between the electrical steel sheets 40 adjacent to each other in the stacking direction. The adhesion part 41 partially adheres the electrical steel sheets 40 adjacent to each other in the stacking direction. The adhesion parts 41 adjacent to each other in the stacking direction have different arrangement regions in a plan view seen in the stacking direction.

With such a configuration, as compared with a case in which the arrangement regions of the adhesion parts adjacent to each other in the stacking direction overlap each other in the plan view seen in the stacking direction, the least common multiple of the adhesion part adjacent to a predetermined adhesion part in the stacking direction and the adhesion part adjacent to the predetermined adhesion part in the circumferential direction becomes large. Therefore, the resonance frequency of the stator core 21 can be increased. As a result, it is possible to prevent the resonance frequencies of the electric motor 10 and the stator core 21 from matching. Therefore, the stator core 21 is less likely to vibrate, and the motor characteristics of the stator core 21 can be improved.

Generally, the adhesive shrinks as it cures. Therefore, compressive stress is applied to the electrical steel sheet as the adhesive cures. When the compressive stress is applied, the electrical steel sheet is strained.

In the stator core 21 (the laminated core) according to the present embodiment, the adhesion part 41 is provided on at least one of the surface 22a of the core back part 22 and the surface 23a of the tooth part 23 in the electrical steel sheet 40.

Thus, a region in which the adhesion part 41 is provided is reduced as compared with a case in which the adhesion part 41 is provided on the entire surface of the stacking surface of the electrical steel sheet 40. Therefore, an amount of strain applied to the electrical steel sheet 40 by the adhesion part 41 is reduced. Therefore, deterioration of the magnetic properties of the stator core 21 can be curbed.

In the stator core 21 (the laminated core) according to the present embodiment, the adhesion parts 41 are provided at an N-layer interval (N is a natural number) so that the arrangement regions thereof overlap each other in a plan view seen in the stacking direction.

Therefore, since the adhesion parts adjacent to each other in the stacking direction have different arrangement regions in the plan view seen in the stacking direction, it is possible to prevent the resonance frequencies of the electric motor 10 and the stator core 21 from matching. For example, in a plan view seen in the stacking direction, the strain generated in the electrical steel sheet 40 becomes uniform in the stacking direction in contrast to a case in which the arrangement regions of the adhesion parts overlap each other in the stacking direction at a non-constant interval. Therefore, it is possible to curb biasing of the strain generated in the electrical steel sheet 40 due to the curing of the adhesive in the stator core 21 as a whole.

Specifically, the adhesion parts 41 are provided at a one-layer interval so that the arrangement regions thereof overlap each other in a plan view seen in the stacking direction. Thus, it is possible to curb local concentration of the electrical steel sheets 40 joined by adhesion on a part of the stator core 21 in the stacking direction. Therefore, the electrical steel sheets 40 joined by adhesion can be dispersed in the stacking direction. Therefore, it is possible to prevent the resonance frequencies of the electric motor 10 and the stator core 21 from matching. As a result, the motor characteristics of the stator core 21 can be further improved.

Further, the adhesion parts 41 are provided at a prime number-layer interval so that the arrangement regions thereof overlap each other in a plan view seen in the stacking direction.

Since the number of divisors of N which is a prime number is small, the least common multiple of the adhesion part adjacent to a predetermined adhesion part in the stacking direction and the adhesion part adjacent to the predetermined adhesion part in the circumferential direction becomes large. Therefore, the resonance frequency of the stator core 21 can be increased. As a result, it is possible to prevent the resonance frequencies of the electric motor 10 and the stator core 21 from matching. Therefore, the motor characteristics of the stator core 21 can be further improved.

The stacking surface of the electrical steel sheet 40 located at one end in the stacking direction among the plurality of electrical steel sheets 40 is entirely adhered to the stacking surface of the electrical steel sheets 40 adjacent to each other in the stacking direction. Further, the stacking surface of the electrical steel sheet 40 located at the other end in the stacking direction among the plurality of electrical steel sheets 40 is entirely adhered to the stacking surface of the electrical steel sheets 40 adjacent to each other in the stacking direction.

Therefore, separation of the stacking surface of the electrical steel sheet 40 located at one end in the stacking direction and the stacking surface of the electrical steel sheet 40 adjacent to this surface in the stacking direction among the electrical steel sheets 40 from each other in the stacking direction is curbed at both an outer peripheral edge and a central portion of the surface. Therefore, it is possible to curb generation of vibration between the surfaces adjacent to each other in the stacking direction.

Similarly, in the electrical steel sheet 40 located at the other end in the stacking direction among the electrical steel sheets 40, it is also possible to curb the generation of vibration between the surfaces adjacent to each other in the stacking direction.

The electric motor 10 according to the present embodiment includes the stator core 21 (the laminated core) according to the present embodiment. Therefore, the motor characteristics of the electric motor 10 can be improved.

The technical scope of the present invention is not limited to the above-described embodiment, and various modifications can be made without departing from the purpose of the present invention.

Here, as shown in FIG. 3, in the stator core 21, an outer one of the plurality of electrical steel sheets 40 in the stacking direction is referred to as an upper end portion (a first end portion) 71. In the stator core 21, the other outer one of the plurality of electrical steel sheets 40 in the stacking direction is referred to as a lower end portion (a second end portion) 72.

Figure 22:
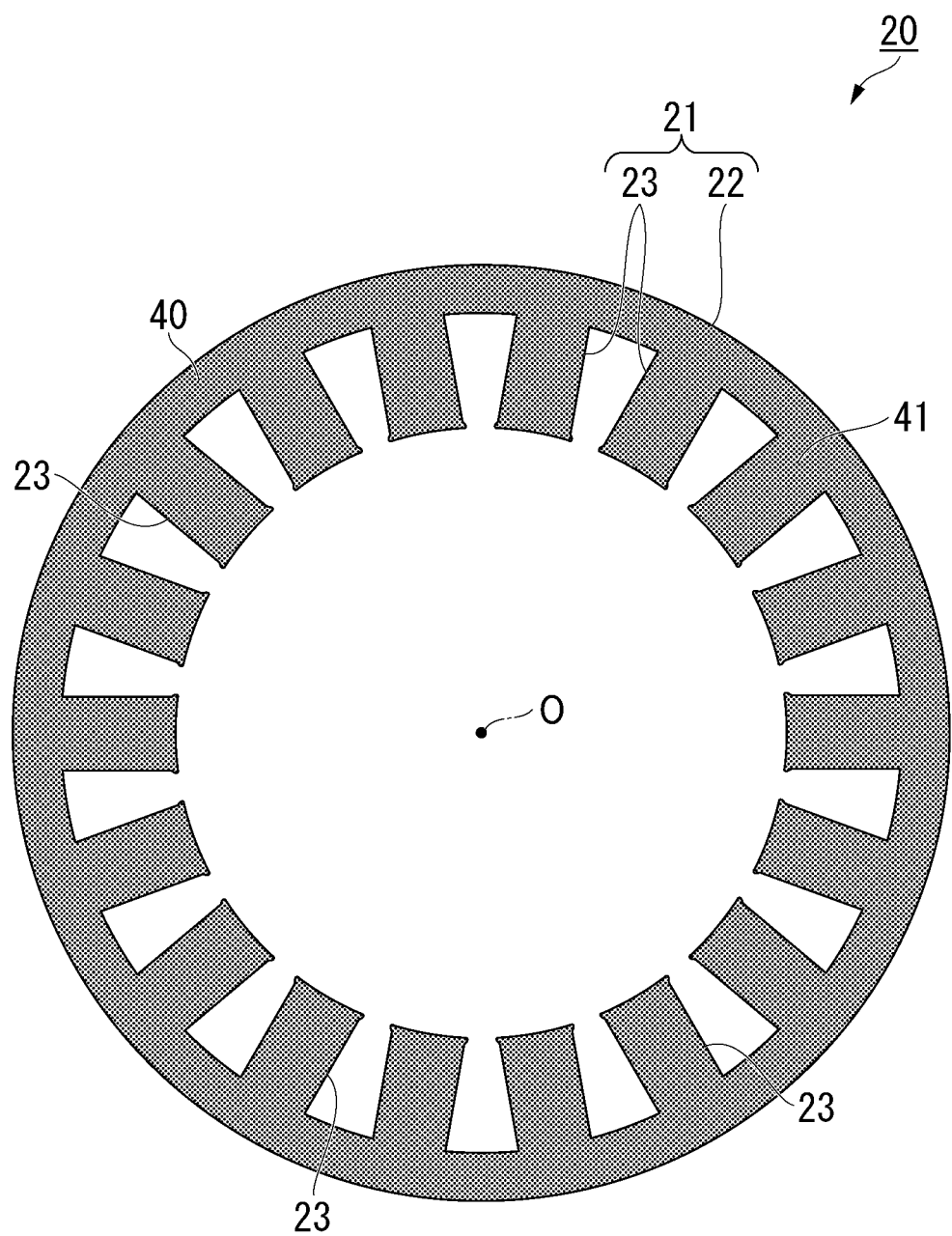
FIG. 22 is a plan view of a laminated core according to an embodiment of the present invention.

As shown in FIG. 22, in the stator core 21, the adhesion part 41 may be provided on the entire surface of the stacking surface (the surface 22a of the core back part 22) of the electrical steel sheet 40 located at the upper end portion 71. Further, the surface 22a of the core back part 22 of the electrical steel sheet 40 may be entirely adhered to the surface 22a of the core back part 22 of the electrical steel sheets 40 adjacent to each other in the stacking direction.

Further, as shown in FIG. 22, in the stator core 21, the adhesion part 41 may be provided on the entire surface of the stacking surface (the surface 23a of the tooth part 23) of the electrical steel sheet 40 located at the upper end portion 71. Further, the surface 23a of the tooth part 23 of the electrical steel sheet 40 may be entirely adhered to the surface 23a of the tooth part 23 of the electrical steel sheets 40 adjacent to each other in the stacking direction.

Similarly, as shown in FIG. 22, in the stator core 21, the adhesion part 41 may be provided on the entire surface of the stacking surface (the surface 22a of the core back part 22) of the electrical steel sheet 40 located at the lower end portion 72. Further, the surface 22a of the core back part 22 of the electrical steel sheet 40 may be entirely adhered to the surface 22a of the core back part 22 of the electrical steel sheets 40 adjacent to each other in the stacking direction.

Further, as shown in FIG. 22, in the stator core 21, the adhesion part 41 may be provided on the entire surface of the stacking surface (the surface 23a of the tooth part 23) of the electrical steel sheet 40 located at the lower end portion 72. Further, the surface 23a of the tooth part 23 of the electrical steel sheet 40 may be entirely adhered to the surface 23a of the tooth part 23 of the electrical steel sheets 40 adjacent to each other in the stacking direction.

According to the above-described configuration, in the stator core 21, the stacking surface of the electrical steel sheet 40 located at the upper end portion 71 in the stacking direction of the stator core 21 among the plurality of electrical steel sheets 40 is entirely adhered to the stacking surface of the electrical steel sheets 40 adjacent to each other in the stacking direction. Further, the stacking surface of the electrical steel sheet 40 located at the lower end portion (the second end portion) 72 of the stator core 21 in the stacking direction among the plurality of electrical steel sheets 40 is entirely adhered to the stacking surface of the electrical steel sheets 40 adjacent to each other in the stacking direction. Thus, it is possible to curb the bias of the strain generated in the electrical steel sheet 40 due to the adhesion part 41. Therefore, it is possible to curb the bias of the strain generated in the entire stator core 21.

In other words, in all the sets of the electrical steel sheets 40 stacked in the stacking direction, it is not necessary that the arrangement regions do not overlap each other in a plan view. At least in some sets of the electrical steel sheets 40, the arrangement regions may not overlap each other in the plan view.

The shape of the stator core is not limited to the form shown in the above-described embodiment. Specifically, dimensions of an outer diameter and an inner diameter of the stator core, the stacking thickness, the number of slots, a dimensional ratio between the circumferential direction and the radial direction of the tooth part, a dimensional ratio in the radial direction between the tooth part and the core back part, and the like can be arbitrarily designed according to the desired properties of the electric motor.

In the rotor of the above-described embodiment, although a set of two permanent magnets 32 form one magnetic pole, the present invention is not limited thereto. For example, one permanent magnet 32 may form one magnetic pole, or three or more permanent magnets 32 may form one magnetic pole.

In the above-described embodiment, although the permanent magnetic electric motor has been described as an example of the electric motor, the structure of the electric motor is not limited thereto as illustrated below, and various known structures not exemplified below can also be adopted.

In the above-described embodiment, although the permanent magnetic electric motor has been described as an example of the synchronous motor, the present invention is not limited thereto. For example, the electric motor may be a reluctance motor or an electromagnet field motor (a wound-field motor).

In the above-described embodiment, although the synchronous motor has been described as an example of the AC motor, the present invention is not limited thereto. For example, the electric motor may be an induction motor.

In the above-described embodiment, although the AC motor has been described as an example of the electric motor, the present invention is not limited thereto. For example, the electric motor may be a DC motor.

In the above-described embodiment, although the motor has been described as an example of the electric motor, the present invention is not limited thereto. For example, the electric motor may be a generator.

In the above-described embodiment, although the case in which the laminated core according to the present invention is applied to the stator core is exemplified, the laminated core according to the present invention can also be applied to the rotor core.

In addition, it is possible to replace the components in the above-described embodiment with well-known components as appropriate without departing from the purpose of the present invention, and the above-described modified examples may be appropriately combined.

INDUSTRIAL APPLICABILITY

According to the present invention, it is possible to provide a laminated core in which the motor characteristics are enhanced and an electric motor including the laminated core. Therefore, the industrial applicability is great.

BRIEF DESCRIPTION OF THE REFERENCE SYMBOLS

10 Electric motor
20 Stator
21 Stator core (laminated core)
22 Core back part
23 Tooth part
30 Rotor
31 Rotor core (laminated core)
32 Permanent magnet
33 Through-hole
40 Electrical steel sheet
41 Adhesion part
50 Case
60 Rotation shaft

The invention claimed is:

1. A laminated core comprising:
a plurality of electrical steel sheets stacked on each other; and
an adhesion part provided between the electrical steel sheets adjacent to each other in a stacking direction and configured to adhere the electrical steel sheets to each other,
wherein the adhesion part partially adheres the electrical steel sheets adjacent to each other in the stacking direction,
wherein the adhesion parts adjacent to each other in the stacking direction have different arrangement regions in a plan view seen in the stacking direction, and
wherein in the adhesion parts, the arrangement regions overlap each other at an N-layer interval (N is a prime number) in a plan view seen in the stacking direction.

2. The laminated core according to claim 1, wherein:
the electrical steel sheet includes an annular core back part, and a plurality of tooth parts which protrude from the core back part in a radial direction and are disposed at an interval in a circumferential direction of the core back part; and
the adhesion parts are provided on at least one of a stacking surface of the core back part and a stacking surface of the tooth part.

3. The laminated core according to claim 1, wherein;
a stacking surface of the electrical steel sheet located at one end in the stacking direction among the plurality of electrical steel sheets is entirely adhered to a stacking surface of the electrical steel sheet adjacent to each other in the stacking direction; and
a stacking surface of the electrical steel sheet located at the other end in the stacking direction among the plurality of electrical steel sheets is entirely adhered to a stacking surface of the electrical steel sheet adjacent to each other in the stacking direction.

4. The laminated core according to claim 1, wherein an average thickness of the adhesion part is 1.0 µm to 3.0 µmm.

5. The laminated core according to claim 1, wherein an average tensile modulus of elasticity E of the adhesion part is 1500 MPa to 4500 MPa.

6. The laminated core according to claim 1, wherein the adhesion part is a room temperature adhesion type acrylic-based adhesive containing SGA made of an elastomer-containing acrylic-based adhesive.

7. An electric motor including the laminated core according to claim 1.

* * * * *